(12) United States Patent
Vacon et al.

(10) Patent No.: US 12,007,272 B2
(45) Date of Patent: Jun. 11, 2024

(54) ENTANGLED PHOTON IDENTIFICATION SYSTEM AND METHOD FOR QUANTUM OPTICAL MEASUREMENT

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC

( * ) Notice: Subject to any disclaimer, the term of this patent is extended or adjusted under 35 U.S.C. 154(b) by 0 days.

(21) Appl. No.: 17/966,796

(22) Filed: Oct. 15, 2022

(65) Prior Publication Data

US 2024/0125644 A1 Apr. 18, 2024

(51) Int. Cl.
*G01J 1/42* (2006.01)

(52) U.S. Cl.
CPC .................. *G01J 1/4228* (2013.01)

(58) Field of Classification Search
CPC .......... G01J 1/4228; G01J 1/42; G06N 10/00; G06N 10/20; G01N 10/40; H04B 10/00
See application file for complete search history.

(56) References Cited

U.S. PATENT DOCUMENTS

| | | |
|---|---|---|
| 5,418,905 A | 5/1995 | Rarity et al. |
| 6,028,935 A | 2/2000 | Rarity et al. |

(Continued)

FOREIGN PATENT DOCUMENTS

| | | |
|---|---|---|
| EP | 3771137 A1 | 1/2021 |
| JP | 6060737 B2 | 1/2017 |

(Continued)

OTHER PUBLICATIONS

Suprano et al., "Detection techniques for Orbital Angular Momentum states", JTh3A.59, CLEO 2021, 2 pages.

(Continued)

*Primary Examiner* — John R Lee
(74) *Attorney, Agent, or Firm* — Rauschenbach Patent Law Group, PLLC; Kurt Rauschenbach

(57) ABSTRACT

A system for imaging using entangled photons includes an optical source that generates a set of four entangled photons correlated in time, such that detection of any one pair of the four entangled photons indicates that all four of the entangled photons are entangled. The optical source couples a first photon to a first path, a second photon to a second path, a third photon to a third path, and a fourth photon to a fourth path. A first detector detects the first photon of the set of four entangled photons. An object positioned at an object plane produces a modulation of the first photon. A spatial sampler detects the second photon. A second detector detects the third photon. A third detector detects the fourth photon. A first coincidence detector determines a coincidence between a detection of the first photon of the set of four entangled photons and a detection of the third photon of the set of four entangled photons. A second coincidence detector determines a coincidence between a detection of the second photon of the set of four entangled photons and a detection of the fourth photon of the set of four entangled photons. A processor generates an image of the object using the coincidences determined by the first and second coincidence detectors.

21 Claims, 11 Drawing Sheets

(56) References Cited

U.S. PATENT DOCUMENTS

| | | | |
|---|---|---|---|
| 7,028,275 B1 | 4/2006 | Chen et al. | |
| 7,072,432 B2 | 7/2006 | Belcea | |
| 7,286,444 B1 | 10/2007 | Bahder et al. | |
| 7,581,100 B2 | 8/2009 | Mizrah | |
| 7,684,015 B2 | 3/2010 | Shih | |
| 7,812,303 B2* | 10/2010 | Meyers | G06N 10/00 250/221 |
| 7,847,234 B2* | 12/2010 | Meyers | H04L 9/0858 250/221 |
| 8,053,715 B2* | 11/2011 | Meyers | G06N 10/00 250/221 |
| 8,242,428 B2* | 8/2012 | Meyers | G01S 17/003 250/203.6 |
| 8,269,978 B2* | 9/2012 | Capron | G01S 17/89 356/484 |
| 8,373,107 B2* | 2/2013 | Meyers | G01S 17/89 250/221 |
| 8,525,149 B2 | 9/2013 | Stevenson et al. | |
| 8,611,535 B2 | 12/2013 | Brodsky et al. | |
| 8,890,049 B2 | 11/2014 | Yuan et al. | |
| 8,983,303 B2 | 3/2015 | Meyers et al. | |
| 9,064,315 B2* | 6/2015 | Meyers | G06T 5/50 |
| 9,131,128 B2* | 9/2015 | Meyers | G06T 5/50 |
| 9,270,385 B2 | 2/2016 | Meyers et al. | |
| 9,331,843 B2 | 5/2016 | Silverman et al. | |
| 9,378,542 B2* | 6/2016 | Meyers | G06T 5/007 |
| 9,473,301 B2 | 10/2016 | Englund et al. | |
| 9,727,959 B2* | 8/2017 | Meyers | G06V 10/50 |
| 9,934,469 B1 | 4/2018 | Jau et al. | |
| 10,541,809 B2 | 1/2020 | Godfrey et al. | |
| 10,595,102 B2 | 3/2020 | Brodsky et al. | |
| 10,790,913 B2 | 9/2020 | Henningsen et al. | |
| 10,992,391 B1 | 4/2021 | Meyers et al. | |
| 11,251,952 B2 | 2/2022 | Lamas-Linares et al. | |
| 11,290,181 B1* | 3/2022 | Meyers | H04B 10/70 |
| 11,367,014 B2 | 4/2022 | Vacon et al. | |
| 11,411,658 B1 | 8/2022 | Vacon et al. | |
| 11,431,418 B2* | 8/2022 | Rauschenbach | H04L 9/0858 |
| 11,507,874 B2 | 11/2022 | Vacon et al. | |
| 11,728,902 B1* | 8/2023 | Meyers | H04B 10/11 398/118 |
| 2004/0208638 A1 | 10/2004 | Jansen | |
| 2005/0100351 A1 | 5/2005 | Yuan et al. | |
| 2005/0199812 A1 | 9/2005 | Shih | |
| 2006/0115086 A1 | 6/2006 | Beausoleil et al. | |
| 2007/0101410 A1 | 5/2007 | Harrison et al. | |
| 2008/0059712 A1 | 3/2008 | Fedorova | |
| 2009/0194702 A1* | 8/2009 | Meyers | H04L 9/0858 356/433 |
| 2012/0294625 A1 | 11/2012 | Dynes et al. | |
| 2016/0112066 A1 | 4/2016 | Ashikhmin | |
| 2016/0191173 A1 | 6/2016 | Malaney | |
| 2017/0364796 A1 | 12/2017 | Wiebe et al. | |
| 2018/0232649 A1 | 8/2018 | Wiebe et al. | |
| 2020/0044749 A1 | 2/2020 | Rauschenbach et al. | |
| 2020/0084033 A1 | 3/2020 | Lamas-Linares et al. | |
| 2020/0313879 A1 | 10/2020 | Hong et al. | |
| 2020/0374211 A1 | 11/2020 | Griffin et al. | |
| 2020/0382219 A1 | 12/2020 | Innes et al. | |
| 2021/0105135 A1 | 4/2021 | Figueroa et al. | |
| 2021/0124640 A1 | 4/2021 | Nickerson et al. | |
| 2021/0132969 A1 | 5/2021 | Smith | |
| 2021/0133614 A1 | 5/2021 | Ashrafi | |
| 2021/0273731 A1 | 9/2021 | Zhang et al. | |
| 2021/0295196 A1 | 9/2021 | Gimeno-Segovia | |
| 2021/0296558 A1 | 9/2021 | Englund et al. | |
| 2021/0325605 A1 | 10/2021 | Rudolph et al. | |
| 2022/0043128 A1 | 2/2022 | Pacala et al. | |
| 2022/0069152 A1 | 3/2022 | Tosi et al. | |
| 2022/0214713 A1 | 7/2022 | Vacon et al. | |
| 2022/0309375 A1 | 9/2022 | Vacon et al. | |
| 2022/0353068 A1 | 11/2022 | Vacon et al. | |
| 2023/0185330 A1* | 6/2023 | Vacon | G06N 10/70 713/400 |
| 2023/0324527 A1* | 10/2023 | Vacon | H04B 10/70 356/5.01 |
| 2023/0327778 A1* | 10/2023 | Vacon | H04B 10/70 706/62 |
| 2023/0327779 A1* | 10/2023 | Vacon | H04B 10/70 706/62 |

FOREIGN PATENT DOCUMENTS

| | | |
|---|---|---|
| JP | 6708062 B2 | 6/2020 |
| WO | 2020/180672 A1 | 9/2020 |
| WO | 2020/232546 A1 | 11/2020 |
| WO | 2021/013990 A1 | 1/2021 |
| WO | 2021/262322 A1 | 12/2021 |
| WO | 2022/140011 A2 | 6/2022 |

OTHER PUBLICATIONS

Placke et al., "Engineering AlGaAs-on-insulator towards quantum optical applications", JTu3A.20, CLEO 2021, 2 pages.

Kavuri et al., "Quantum state tomography at the Tsirelson bound", JTu3A.45, CLEO 2021, 2 pages.

Devetak et al., "Distillation of secret key and entanglement from quantum states", Proceedings of the Royal Society A, vol. 461, 2004, pp. 207-235.

Rangarajan et al., "Optimizing type—I polarization-entangled photons", Optics Express, vol. 17, No. 21, Oct. 12, 2009, pp. 18920-18933.

Strekalov et al., "Postselection-free energy-time entanglement", Physical Review A, Third Series, vol. 54, No. 1, Jul. 1996, pp. R1-R4.

Kaneda et al., "Heralded single-photon source utilizing highly nondegenerate, spectrally factorable spontaneous parametric downconversion", Optics Express, vol. 24, No. 10, May 16, 2016, pp. 10733-10747.

Zielnicki, Kevin, "Pure Sources And Efficient Detectors For Optical Quantum Information Processing", 2014, 104 pages.

Lesovik et al., "Arrow of time and its reversal on the IBM quantum computer", Scientific Reports, 2019, vol. 9, No. 4396, 2019, 8 pages.

Ursin et al. "Entanglement-based quantum communication over 144 km", Nature Physics, vol. 3, Jul. 2007, pp. 481-486.

Giovannetti et al., "Quantum-enhanced positioning and clock synchronization", Nature, vol. 412, Jul. 26, 2001, 16 pages.

Hong et al., "Optical communication channel based on coincident photon pairs", Applied Optics, vol. 24, No. 22, Nov. 15, 1985, pp. 3877-3882.

Matsukevich et al., "Bell Inequality Violation with Two Remote Atomic Qubits", Physical Review Letters, vol. 100, Apr. 18, 2008, pp. 150404-1-150404-4.

Kong et al., "Implementation of Multiparty quantum clock synchronization", arXiv:1708.06050v2, 2017, 6 pages.

Venkatasubramanian, Nalini, "Time in distributed Systems", 66 pages.

Kim et al., "Delayed "Choice" Quantum Eraser", Physical Review Letters, vol. 84, No. 1, Jan. 3, 2000, 5 pages.

Butner et al., "Nanosecond-scale Event Synchronization over Local-area Networks", Proceedings of the 27th Annual IEEE Conference on Local Computer Networks, 2021, 9 pages.

Wittje, Roland, "Noise: From nuisance to research subject", Physics Today 73, Feb. 2020, pp. 8 pages.

Quan et al., "Nonlocal temporal correlation identification of entangled photon pairs for quantum clock synchronization", 10 pages.

Boughn, Stephen, "Making Sense of Bell's Theorem and Quantum Nonlocality", Found Physics, 2017, 18 pages.

D'Ambrosio et al., "Complete experimental toolbox for alignment-free quantum communication", Nature communications, vol. 3, 2012, 8 pages.

Altepeter et al., "Phase-compensated ultra-bright source of entangled photons", Optics Express, vol. 13, No. 22, Oct. 31, 2005, pp. 8951-8959.

Martin et al., "Quantifying Photonic High-Dimensional Entanglement", vol. 118, issue 11, Mar. 17, 2017, pp. 110501-1-110501-5.

(56) References Cited

OTHER PUBLICATIONS

Das et al., "Robust quantum network architectures and topologies for entanglement distribution", Physical Review A 97, 2018, pp. 012335-1-012335-12.

Ekert, Artur K., "Quantum Cryptography Based on Bell's Theorem", Physical Review Letters, vol. 67, No. 6, Aug. 5, 1991, pp. 661-663.

Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.

Bennett et al., "Entanglement-Assisted Classical Capacity of Noisy Quantum Channels", Physical Review Letters, vol. 83, No. 15, Oct. 11, 1999, pp. 3081-3084.

Lloyd et al., "Long Distance, Unconditional Teleportation of Atomic States via Complete Bell State Measurements", Physical Review Letters, vol. 87, No. 16, Oct. 15, 2001, pp. 167903-1-167903-4.

Jozsa et al., "Quantum Clock Synchronization Based on Shared Prior Entanglement", Physical Review Letters, vol. 85, No. 9, Aug. 28, 2000, pp. 2010-2013.

Bennett et al., "Purification of Noisy Entanglement and Faithful Teleportation via Noisy Channels", vol. 76, No. 5, Jan. 29, 1996, pp. 722-725.

Shi et al., "Privacy-preserving Quantum Sealed-bid Auction Based on Grover's Search Algorithm", Scientific Reports, vol. 9, 2019, pp. 1-10.

Demirel et al., "Correlations for computation and computation for correlations", Nature Partner Journals, vol. 7, 2021, pp. 1-8.

Gogo et al., "Comparing quantum and classical correlations in a quantum eraser", Physical Review A, vol. 71, 2005, pp. 052103-1-052103-6.

Agam et al., "Shot Noise In Chaotic Systems: "Classical" to Quantum Crossover", Physical Review Letters, vol. 85, No. 15, Oct. 9, 2000, pp. 3153-3156.

Stipcevic, Mario, "Quantum random number generators and their applications in cryptography", Proc. of SPIE, vol. 8375, 2012, pp. 837504-1-837504-15.

Quan et al., "Demonstration of quantum synchronization based on second-order quantum coherence of entangled photons", Scientific Reports, vol. 6, 2016, pp. 1-8.

Bedington et al., "Progress in satellite quantum key distribution", Quantum Information, vol. 3, 2017, pp. 1-13.

Nolleke et al., "Efficient Teleportation Between Remote Single-Atom Quantum Memories", Physical Review Letters, vol. 110, Apr. 5, 2013, pp. 140403-1-140403-5.

Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.

Pant et al., Routing entanglement in the quantum internet, arXiv:1708.07142v2, Sep. 22, 2017, 13 pages.

Leung et al., "Deterministic bidirectional communication and remote entanglement generation between superconducting qubits", npj Quantum Information, vol. 5, 2019, 5 pages.

Kemparaj et al., "Secure precision time protocol in packet switched networks", IEEE, 2019, 6 pages.

Shih, Yanhua, "The physics of ghost imaging", Optical Society of America, 32 pages.

Mahmood et al., "Delay and Jitter Characterization for Software-Based Clock Synchronization Over WLAN Using PTP", IEEE Transactions on Industrial Informatics, vol. 10, No. 2, 2014, May 2014, pp. 1198-1206.

Paesani et al., "Generation and sampling of quantum states of light in a silicon chip", Nature Physics, 2018, 27 pages.

Joly et al., "Fibre-based pressure-controlled sources for quantum optics", STh1A.5, CLEO 2021, 2 pages.

Simon et al., "High-capacity quantum key distribution via hyperentangled degrees of freedom", New Journal of Physics, vol. 16, Jun. 24, 2014, 21 pages.

Shen et al., "Classically Entangled Vectorial Structured Light towards Multiple Degrees of Freedom and Higher Dimensions", STh1B.1, CLEO 2021, 2 pages.

Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.

Liu et al., "General scheme for superdense coding between multiparties", Physical Review A, vol. 65, 2002, pp. 022304-1-022304-4.

Karlsson et al., "Quantum teleportation using three-particle entanglement", Physical Review A, vol. 58, No. 6, Dec. 1998, pp. 4394-4400.

Treiber et al., "A fully automated entanglement-based quantum cryptography system for telecom fiber networks", New Journal of Physics, vol. 11, Apr. 30, 2009, 20 pages.

Pfaff et al., "Unconditional quantum teleportation between distant solid-state quantum bits", Quantum Information, vol. 345, No. 6196, Aug. 1, 2014, pp. 532-535.

Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.

Mkacher et al., "Calibrating NTP", IEEE, 2019, 6 pages.

Chapman et al., "Hyperentangled Time-bin and Polarization Quantum Key Distribution", arXiv:1908.09018v3, 2020, 39 pages.

Mandel, L., "Proposal for almost noise-free optical communication under conditions of high background", J. Opt. Soc. Am. B, vol. 1, No. 1, Mar. 1984, pp. 108-110.

Ursin et al., "Quantum teleportation across the Danube", Nature, vol. 430, Aug. 19, 2004, pp. 849.

Ilo-Okeke et al., "Remote quantum clock synchronization without synchronized clocks", Npj Quantum Information, 2018, 5 pages.

Resch et al., "Distributing entanglement and single photons through an intra-city, free-space quantum channel", Optics Express, vol. 13, No. 1, Jan. 10, 2005, pp. 202-209.

Jennewein et al., "Quantum Cryptography with Entangled Photons", Physical Review Letters, vol. 84, No. 20, May 15, 2000, pp. 4729-4732.

Using coincidence correlation for studying quantum optic systems, Piqoquant GMBH, Jun. 1, 2018, 6 pages.

Time in distributed systems: clocks and ordering of events, Indian Institute of Technology Kharagpur, Department of computer Science and Engineering, 38 pages.

Time in distributed systems, University of Cambridge, Cambridge, UK, 20 pages.

Giovannetti et al., "Limits to clock synchronization induced by completely dephasing communication channels", Physical Review A, Jun. 17, 2002, vol. 65, 062319-1-062319-6.

Bennett et al., "Quantum cryptography: public key distribution and coin tossing," Theoretical Computer Science Theoretical Aspects of Quantum Cryptography, 2014, vol. 560, Part 1, pp. 7-11.

Kiesel et al., "Experimental Analysis of a Four-Qubit Photon Cluster State", Physical Review Letters, vol. 95, 210502, Nov. 18, 2005, pp. 1-4.

Aull et al., "Geiger-Mode Avalanche Pholodiodes for Three-Dimensional Imaging", Lincoln Laboratory Journal, vol. 13, No. 2, 2002, pp. 335-350.

Avalanche Pholodiodes: A User's Guide, PerkinElmer, 2003, 8 pages.

Oh, J., et al., "Coincidence Rates for Photon Pairs in WDM Environment", Journal of Lightwave Technology, vol. 29, No. 3, Feb. 1, 2011, pp. 324-329.

Grieve et al., "Correcting for accidental correlations in saturated avalanche photodiodes", Optics Express, vol. 24, No. 4, Feb. 22, 2016, pp. 3592-3600.

Guo et al., "Tesling the Bell inequality on frequency-bin entangled photon pairs using lime-resolved detection", Optica, vol. 4, No. 4, Apr. 2017, pp. 388-392.

Lee et al., "Temporal Multiplexing of Heralded Single Photon Sources Using Optical Fiber Delays", Korea Institute of Science and Technology Information—Korea Research Institute of Standards and Science, 2020, 3 pages.

Shi et al., "Breakdown flash at telecom wavelengths in InGaAs avalanche photodiodes", Optics Express, vol. 25, No. 24, Nov. 27, 2017, pp. 30388-30394.

(56) References Cited

OTHER PUBLICATIONS

Wengerowskya et al., Entanglement distribution over a 96-km-long submarine optical fiber, PNAS, vol. 116, No. 14, Apr. 2, 2019, pp. 684-6688.
Bhandari et al., "Low-Cost Coincidence-Counting Electronics for Quantum Optics", Department of Physics, 2007, 2 pages.
Gentry et al., "Quantum-correlated photon pairs generated in a commercial 45 nm complementary metal-0xide semiconductor microelectronic chip", Optica, vol. 2, No. 12, Dec. 2015, pp. 1065-1071.
Rarity et al., "Single-photon counting for the 1300-1600-nm range by use of Peltier-cooled and passively quenched nGaAs avalanche photodiodes", Applied Optics, vol. 39, No. 36, Dec. 20, 2000, pp. 6746-6753.
Park et al., "High-performance reconfigurable coincidence counting unit based on a field programmable gate array", applied optics, vol. 54, No. 15, May 20, 2015, pp. 4727-4731.
Boso et al., "Low-cost and compact single-photon counter based on a CMOS SPAD smart pixel", IEEE Photonics technology Letters, vol. 27, No. 23, Dec. 1, 2015, 4 pages.
Unternahrer et al., "Coincidence Detection of Spatially Correlated Photon Pairs with a Novel Type of Monolithic time—Resolving Detector Array", IEEE, 2017, 1 page.
Unternahrer et al., "Coincidence detection of spatially correlated photon pairs with a monolithic time-resolving detector array", Optics Express, vol. 24, No. 15, Dec. 12, 2016, pp. 28829-28841.
Hong et al., "Measurement of Subpicosecond Time Intervals between Two Photons by Interference," Physical Review Letters, vol. 59, No. 18, 2044, Nov. 2, 1987, pp. 1-3.
Achatz et al., "High-dimensional EPR entanglement from a SPDC source at telecom wavelength", arXiv: Quantum Physics, 2021, pp. 1-7.
Shih, Yanhua, "The physics of ghost imaging", Department of Physics, University of Maryland, Baltimore County, Baltimore, MD 21250, U.S.A., 2009, pp. 1-37.
Erkmen et al., "Ghost imaging: from quantum to classical to computational", Advances in Optics and Photonics, vol. 2, 2010, pp. 405-450.
Shapiro et al., "Classical Imaging with Undetected Photons" Scientific Reports, vol. 5, No. 10329, 2015, pp. 1-8.
Shapiro et al., "On-demand single-photon generation using a modular array of parametric down converters with electro-optic polarization controls," Opt. Lett., vol. 32, 2007, 2698-2700.
Wang, et al., "On-Demand Semiconductor Source of Entangled Photons Which Simultaneously Has High Fidelity, Efficiency, and Indistinguishability", Physical Review Letters, vol. 122, 113602, 2019, 6 pages.
Muller, et al., "On-demand generation of indistinguishable polarization-entangled photon pairs," URL: https://arxiv.org/ftp/arxiv/papers/1308/1308.4257.pdf, Aug. 21, 2013, 5 pages.
Clemmen, et al., "All-optically tunable buffer for single photons", Optics Letters, vol. 43, No. 9, Apr. 27, 2018, pp. 2138-2141.
Heshami et al., "Quantum memories: Emerging Applications and Recent Advances," Journal of modern optics, vol. 63, No. 20, 2016, pp. 2005-2028.
Cho, et al., "Highly efficient optical quantum memory with long coherence time in cold atoms", Optica, vol. 3, No. 1, Jan. 15, 2016, pp. 100-107.
Nunn et al., "Enhancing multiphoton rates with quantum memories", Centre for Quantum Technologies, Sep. 9, 2018, 5 pages.
Hamel et al., "Direct generation of three-photon polarization entanglement", Institute for Quantum Computing and Department of Physics & Astronomy, Apr. 28, 2014, 9 pages.
Mattle et al., "Dense Coding in Experimental Quantum Communication", Physical Review Letters, Jun. 17, 1996, vol. 76, No. 25, , pp. 4656-4659.
Chen et al., "Heralded Quantum Random Access Memory in a Scalable Photonic Integrated Circuit Platform", Optical Society of America, 2021, 2 pages.
Ball et al., "Quantum firmware and the quantum computing stack", Physics Today, Mar. 2021, vol. 74, No. 3, , pp. 28-34.
Kaczmarek et al., "A Noiseless Quantum Optical Memory at Room Temperature", Frontiers in Optics, 2017, 2 pages.
Li et al., "Quantum Supremacy Circuit Simulation on Sunway TaihuLight", URL:https://arxiv.org/pdf/1804.04797.pdf Aug. 13, 2018, pp. 1-11.
Zhang et al., "Examples on quantum search algorithm with optimized depth", Dec. 11, 2019, pp. 1-7.
Kanamori et al., "Three-party Quantum Authenticated Key Distribution with Partially Trusted Third Party", IEEE Global Telecommunications Conference, IEEE, 2008, 5 pages.
Weihs et al., "Violation of Bell's inequality under strict Einstein locality conditions", Physical Review Letters, vol. 81, No. 23, Dec. 7, 1998, pp. 5039-5043.
Smith et al., "Quantifying Coherence and Entanglement via Simple Measurements", arXiv:1707.09928v1, Jul. 31, 2017, 9 pages.
Ding et al., "The Cross-Correlation of Binary Sequences With Optimal Autocorrelation", IEEE Transactions On Information Theory, 2010, vol. 56, No. 4, Apr. 2010, pp. 1694-1701.
Shrivastav et al., "Globally Synchronized Time via Datacenter Networks", IEEE/ACM Transactions On Networking, Aug. 2019, vol. 27, No. 4, Aug. 2019, pp. 1401-1416.
Peloso et al., "Daylight operation of a free space, entanglement-based quantum key distribution system", New Journal of Physics 11, 2009, 13 pages.
Brunner et al., "Detection loophole in asymmetric Bell experiments", PRL 98, 220403, 2007, pp. 220403-1-220403-4.
Meyer-Scott et al., "Single-photon sources: Approaching the ideal through multiplexing", Review of Scientific Instruments, 2020, vol. 91, No. 4, 2020, pp. 041101-1-041101-18.
Saleh et al., "Towards spontaneous parametric down conversion from monolayer MoS2", Scientific Reports, vol. 8, No. 3862, 2018, 7 pages.
Fanto et al., "Multipli-entangled photons from a spontaneous parametric down-conversion source", Quantum Information and Computation, vol. 8057, 2011, pp. 805705-1-805705-12.
Ilic, Nikolina, "The Ekert Protocol", Journal of Physics, 334, Jul. 22, 2007, 4 pages.
Haider et al., "Entangling Independent Photons by Time Measurement", Nature Physics, vol. 3, Oct. 2007, pp. 692-695.
Zhuang et al., "Entanglement-Enhanced Lidars for Simultaneous Range and Velocity Measurements." Physical Review A, vol. 96, No. 4, Oct. 2017, pp. 040304-1-040304-6.
Guccione et al., "Connecting heterogeneous quantum networks by hybrid entanglement swapping", Sci. Adv., vol. 6, No. 22, 2020, pp. 1-6.
Gisin, Nicolas, "Entanglement 25 Years after Quantum Teleportation: Testing Joint Measurements in Quantum Networks", Entropy, vol. 21, 2019, pp. 1-12.
Anderson, Brian P., "Field Guide to Quantum Mechanics", SPIE Field Guides, vol. FG44, 2019, 152 pages.
Arrazola et al., "Quantum Fingerprinting with Coherent States and a Constant Mean Number of Photons", Physical Review A 89, 2014, pp. 062305-1-062305-6.
Kwiat et al., "New High-Intensity Source of Polarization-Entangled Photon Pairs", Physical Review Letters, vol. 75, No. 24, Dec. 11, 1995, pp. 4337-4341.
Zhao et al., "Experimental Demonstration of Five-photon Entanglement and Open-destination Teleportation", Nature, vol. 430, Jul. 2004, 19 pages.
Morrison et al., "High dimensional frequency-bin entanglement from domain engineered parametric downconversion", FM1N.1, CLEO, 2021, 2 pages.
Kashi et al., "Enabling Scalability of Photonic Frequency-Domain Quantum Processing", FM1N.4, CLEO 2021, 2 pages.
Chang et al., "Quantification of High-dimensional Energy-time Entanglement in a Biphoton Frequency Comb", FM3M.6, CLEO 2021, 2 pages.
Sloan et al., "Two photon emission from superluminal and accelerating index changes", FM3N.4, CLEO 2021, 2 pages.
Kviatkovsky et al., "Microscopy with undetected photons in the mid-infrared", FTh20.5, CLEO 2021, 2 pages.
Goswami, Abhirup, "Analysis of a Deterministic Entangled Photon Pair Source using Single Photons", Sep. 2016, 79 pages.

(56) References Cited

OTHER PUBLICATIONS

Haroche, Serge, "Entanglement, Decoherence And The Quantum/Classical Boundary", Physics Today, vol. 51, Jul. 1998, pp. 36-42.
Brunner et al., "Bell nonlocality", Reviews of Modern Physics, vol. 86, 2014, pp. 419-478.
Merkouche et al., "Multiple pulse-mode Bell states heralded via entanglement swapping", JM4E.6, CLEO 2021, 2 pages.
Lee, Catherine, "High-Dimensional Quantum Communication Deployed Fiber", Feb. 2018, 143 pages.
Hu et al., "Beating the channel capacity limit for superdense coding with entangled ququarts", Science Advances, vol. 4, Jul. 20, 2018, pp. 1-5.
Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.
Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.
Goswami et al., "Indefinite causal order in a quantum switch", Physical Review Letters, vol. 121, 2018, pp. 090503-1-090503-5.
Galvez, Enrique J., "Correlated-Photon Experiments Laboratory Manual", Colgate University, 2008, 27 pages.
Chen et al., "Joint Time and Frequency Dissemination Network Over Delay-Stabilized Fiber Optic Links", IEEE Photonics Journal, vol. 7, No. 3, Jun. 2015, 10 pages.
Sulimany et al., "All-Fiber Source and Sorter for Multimode Correlated Photons", JTh3A. 17, CLEO 2021, 2 pages.

\* cited by examiner

| | a | c | d | b |
|---|---|---|---|---|
| Allowed | Random | Random | Random | Random |
| Not Allowed | Coincidence | Coincidence | Random | Random |
| Not Allowed | Coincidence | Random | Coincidence | Random |
| Allowed | Coincidence | Random | Random | Coincidence |
| Allowed | Random | Coincidence | Coincidence | Random |
| Not Allowed | Random | Coincidence | Random | Coincidence |
| Not Allowed | Random | Random | Coincidence | Coincidence |
| Coincidence | Coincidence | Coincidence | Coincidence | Random |
| Not Allowed | Coincidence | Coincidence | Random | Coincidence |
| Allowed | Coincidence | Coincidence | Coincidence | Coincidence |

|  | D1A | D2A | D1B | D2B |
|---|---|---|---|---|
| Good | Event | Event | Event | Event |
| Error | Missed | Event | Event | Event |
| Error | Event | Missed | Event | Event |
| Error | Missed | Missed | Event | Event |
| Error | Event | Event | Missed | Event |
| Detected Error | Missed | Event | Missed | Event |
| Detected Error | Event | Missed | Missed | Event |
| Detected Error | Missed | Missed | Missed | Event |
| Error | Event | Event | Event | Missed |
| Detected Error | Missed | Event | Event | Missed |
| Detected Error | Event | Missed | Event | Missed |
| Detected Error | Missed | Missed | Event | Missed |
| Error | Event | Event | Missed | Missed |
| Detected Error | Missed | Event | Missed | Missed |
| Detected Error | Event | Missed | Missed | Missed |
| Detected Error | Missed | Missed | Missed | Missed |

FIG. 3C

ENTANGLED PHOTON IDENTIFICATION SYSTEM AND METHOD FOR QUANTUM OPTICAL MEASUREMENT

The section headings used herein are for organizational purposes only and should not be construed as limiting the subject matter described in the present application in any way.

INTRODUCTION

Systems that exchange information using single photons are useful for a wide variety of computing, communication, and measurement applications. One example of such systems are systems that use photon phase correlation to perform sensing and measurement. This includes quantum ghost imaging and various other optical imaging systems. For these systems, the sharing of classical state information, quantum state information, and various hybrids of these can be used to increase secrecy, accuracy, precision and speed of data taking as compared to classical systems. As such, methods and systems that support and improve state information transfer using single photons is useful in advancing the state-of-the art identification and measurement systems. Of particular interest currently are systems that exploit time correlation across sets of photons that number more than two.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 3B illustrates a table of cases for an event list associated with an embodiment of the system for sharing quantum information using time-correlated single photons of FIG. 3A.

FIG. 3C illustrates a table of lost photons and false coincidences for an embodiment of the system for sharing quantum information using time-correlated single photons generated using the system of FIG. 3A.

DESCRIPTION OF VARIOUS EMBODIMENTS

Figure 1:
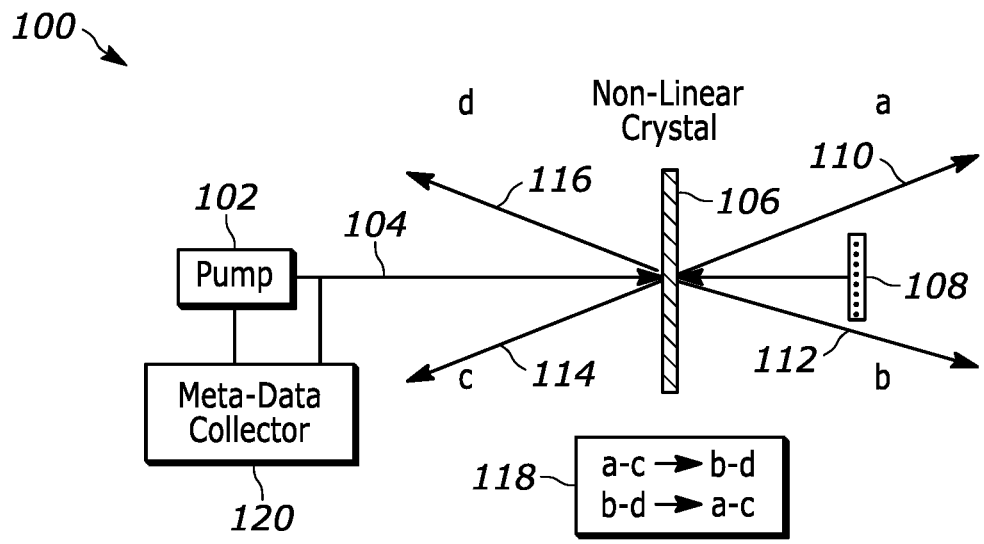
FIG. 1 illustrates an embodiment of a photon source that generates time-correlated quadruplets of single photons.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Quantum entanglement is a powerful resource that has numerous applications in a variety of processing, sensing and communications applications. One important and basic requirement for the efficient and effective use of quantum entanglement is the need to quickly and/or easily identify the entangled resources. For example, each photon in a pair of entangled photons can carry state information that is entangled such that the values of those states are the same when measured. As such, it is necessary to identify photons that are part of a pair of entangled photons, to know that a particular measured value is one of two shared correlated values. Generally, each photon in a set of entangled photons can carry state information that is entangled such that the values of those states are the same when measured. For optical measurement applications, the correlation of entangled photons, specifically in a phase dimension and/or a time dimension, can produce very precise time and/or position measurements. In addition, for optical measurement applications, the non-local correlation of entangled photons can be used to provide a point-to-point image correlation between optical detections at an object plane and an image plane. These applications require the timely and accurate identification of photons that are part of a set of entangled photons in order to know the measurements using the photons of the set are correlated.

Identifying photon sets that are entangled, and the corresponding measured state values that are correlated, is notably different from classical resource identification systems or methods. This is particularly true when classical systems and methods are used for optical measurement systems because these systems typically produce, process, and detect large numbers of photons. Some of the differences arise, at least in part, because the measurement of a photon collapses any associated quantum state or states in an irreversible way. Some of the differences arise, at least in part, because quantum resources can be quantized where their states take on only specific and/or singular values that are not characteristic of large numbers of photons and the associated analog opto-electronic detection of those photons. Some of the differences also arise because entangled resources carry perfectly correlated state information. Also, some of the differences arise because of various combinations of these qualities.

Another important difference between identifying classical data sets and identifying entangled photons and their associated correlated state values arises because many well-known, low cost, sources of entangled photons generate orders of magnitude more photons that are not entangled compared with photons that are entangled. Also for many practical systems, the photons that are not entangled must not be erroneously identified as entangled. This results in a kind of high background single photon noise condition. Quite different from classical situations, it is possible to find and process quantum information that is surrounded by very high single photon backgrounds. In contrast, classical optical detection and measurement systems reach a point where it is not possible to detect and process an optical image or other signal once the signal level falls sufficiently below a classical noise level. In contrast, the entangled photon identification method and system of the present teaching can operate when a number of legitimate entangled, correlated photons in a measurement window is multiple orders of magnitude less than a number of non-entangled background photons or background counts from other sources in that same measurement window. In fact, many engineering design "rules of thumb" that are commonly accepted and used for classical imaging and measuring systems are not usable or have limited use in similar quantum versions of those imaging and measuring systems. This can be true even if the classical apparatus and quantum apparatus share the same, or similar, physical structure.

The performance of entangled photon identification is also subject to lost photon events that can create error conditions. There is an expectation that a correlated state value at one location from measurement of one of the photons in the set has a correlated pair state value at a second location from measurement of another photon in the set, and this measured state value is not present, causing an error in the correlated data sets.

For purposes of the present teaching, we describe two different forms of quantum information: quantum information in a quantum form and quantum information in a classical form. Quantum information in a quantum form includes quantum information in a potential state. Some refer to a potential quantum state as "res potentia", that is, offering possibilities. Examples of a potential state include a coherent state, a superposition state, and an entangled state. In some cases, a potential quantum state is a state that is unknown and/or not yet measured. We also use the term quantum information to include information in a classical form. This quantum information includes, for example information in a measured or collapsed state. This kind of quantum information is, for example, the outcome of a measurement of potential state that yields a particular state value (e.g., one of the possible superposition states). We also use the term quantum information in a classical form to include wavefunction information that can include a deterministic description that bounds and/or provides the evolution of a potential state of a quantum system. Although both the measured states and the wavefunction information are quantum information, they differ from the potential state information in that they are classical in nature. For one thing, they are actual or known. Also, they can be communicated over classical channels and used and/or processed by classical information systems, including classical memory, CPU, analog and/or digital processors, and a variety of classical sensing and measurement systems that may be analog and/or digital in nature, without any fundamental change to their properties.

It is important to emphasize that quantum information in a quantum form has certain quantum properties e.g., quantization, superposition, non-locality, correlation and combinations of these qualities. A quantum potential state description applies when the system is coherent or still in superposition. A notable quality of the potential state is that at least some of the quantum state information is not known. Once the carriers of quantum state information in a quantum form e.g., photons, atoms, ions, and superconducting junction currents, are measured to yield the quantum state information, the states of those carriers are collapsed, and therefore yield measured quantum state information is then in a classical form. This measured quantum state information is classical in nature, and can be further processed in a classical way, but yet it is intimately connected to the quantum nature of the potential state that was measured, which are reasons why it is referred to herein as quantum information. As examples, non-locality, and correlation properties are characteristic of quantum information in a classical form. These properties are not possible with purely classical information derived from classical systems.

In addition to the above description of the different forms of quantum and classical information, it is important to consider how the systems and applications use the quantum information. Some applications and systems that use quantum information use a portion of the quantum information they intake to directly process, store, measure, sense and/or communicate. It is convenient for the purposes of this disclosure to refer to this portion of the quantum information as the quantum data. Another portion of the quantum information the applications and systems receive is used to aide in the processing, measuring, sensing and/or communicating of the quantum data. It is convenient to refer to this portion of the quantum information as the quantum metadata.

The quantum data and quantum metadata terminology are analogous to the use of the term metadata in information technology as referring to information about the data, as opposed to the data itself. The portion of quantum information that is considered quantum data and the other portion of quantum information that is considered quantum metadata is more closely tied to the application or system that is using the quantum physical system. In contrast, whether quantum information is in a classical form or a quantum form is more closely tied to the particular quantum physical system. The definitions or categorizations of what information is quantum metadata and what information is quantum data can change from one application to another, or for different operations within the same application.

References herein to classical information include information that can be used by classical information systems. As such, this includes general classical information that is naturally or by its origin in a classical form and can also include quantum information in a classical form.

The method and system of the present teaching addresses a need for efficiently identifying entangled resources for optical measurements that use single photons. However, it should be understood that the teaching is not intended to be so limited. As understood by those skilled in the art, aspects of the teaching can apply to resources of numerous entangled systems including, for example, entangled atomic systems, ionic systems, spin systems, superconducting systems, quantum dots, and other systems. In these systems, the quantum state information, and associated quantum metadata concepts remain the same, but the physical system that carries the state, as well as, in some cases the different entangled bases, is different as understood by those skilled in the art. The present teaching can also be applied to hybrids of these and other types of systems.

Single photons are a powerful resource that carries correlated timing, phase and position information that can be used in a variety of quantum and/or classical systems that measure time, position, distance, phase and other related parameters. Specifically, it is known that interferometric systems can benefit from quantum optical states. For example, the Laser Interferometry Gravitation-Wave Observatory (LIGO), Light Distance and Ranging (LiDAR), optical coherence tomography, optical interferometric imaging can benefit from optical quantum states as can numerous optical image measurement systems. It is also understood that phase-sensitive correlation can be used to generate an image of an object from photons that have not interacted with the object when the photons that generate the image are correlated with other photons that do interact with the image. Entangled photons are particularly well suited to this task because of their inherent correlation properties. For entangle pairs of photons, one photon of the pair interacts with the object, and the other photon of the pair can be used to generate the image. Generally multiple pairs of entangled photons are used to create a multi-dimensional image. Thus remote, non-local imagers, such as the ghost imagers, can, therefore, also benefit from optical quantum states.

Single photons are indivisible particles and consequently their measurement is unique and well-defined. This leads to desirable features including privacy, security, tolerance to third party meddling and/or snooping, and quantization features useful for various communication, computing, and sensing applications.

At the same time, various optical sources are available and currently in development that can generate two, or more, entangled photons at a same time. For example, spontaneous parametric down conversion (SPDC) generates pairs of single photons at a same time. Some configurations of SPDC, for example, those that use forward and backward pumping, can generate four photons at a same time. Processes, such as four-wave mixing and Raman can also be used to generate pairs, triplets and/or quadruplets of photons that are all generated at a same time. In many cases, the time correlation is owed to time-energy entanglement processes.

We may refer to these entangled sets of single photons as time-correlated photon sets or sets of entangled photons. There can be any number of time correlated photons in a set. A set of four entangled photons may be referred to as a quadruplet. Multiple sets of entangle photons are typically generated by an optical source over time. The number of sets per second is referred to as the generation rate. Spontaneous parametric down conversion sources, and many other down conversion and nonlinear sources can be configured to generate multiple sets of entangled photons over time. Some random or spontaneous processes generate streams of these time-correlated photon sets such that the time between arrivals of the time-correlated photons is governed by random processes and so the arrival times of these photon sets, and the inter-arrival time between photon sets, are correlated random values.

A common challenge with using the properties of the entangled time-correlated photon sets is that the time-correlated photons are typically surrounded in, e.g., time and space, by high levels of background photons, which is essentially noise. Low-cost sources, such as SPDC sources, typically generate more photons that are not time-correlated than are time correlated. Furthermore, photons are measured using detectors that produce substantial levels of background signals in addition to actual photon measurements. One feature of the present teaching is the ability to identify time-correlated photons amidst high levels of noise, photons from sources that are not correlated, and background signals with a minimum amount of computation and hardware.

Thus, one feature of the present teaching is that time correlations of entangled single photons having non-local properties can be exploited in measurement systems to achieve new functionality and/or improved performed metrics as compared to classical versions of these measurement systems and also as compared to known quantum versions of these measurement systems. In particular, using time correlations of entangled single photons according to the present teaching can achieve performance improvements in synchronization, reduction of noise and/or background resilience, and/or measurements of time and space that rely on quantum state information exchange. These performance improvements can be robust to high background counts.

Various sources support generation of single photons, including time-correlated single photons, that are entangled in various distinguishable bases. Entanglement refers to photons that share quantum state information such that measurements of each photon in one or more bases, even if performed at different times and/or places, yields measured quantum states in each basis that are perfectly correlated. Sometimes these states in each basis are referred to a superposition states. Example bases include time-energy, spatial position, momentum, polarization, wavelength and phase. For measurement applications, time-energy and phase bases are particularly useful.

Time-energy entangled photons possess a continuum of entangled time probabilities defined by their probability wavefunction, which we may refer to as a time wave packet. The probabilistic nature of the time-correlated value can be exploited if sub-wavepacket time resolution is used. By sub-wavepacket time resolution we mean time resolution less than a wave packet duration. Even with lower time resolution, the correlation can be exploited to find correlated photons precisely and/or within large background environments. In addition, many entangled photon generators rely on stochastic processes that are themselves random, allowing time-correlated photons to carry random time information based on those processes along with them. These features are exploited in various ways for measurement schemes that use embodiments of the time-correlated photon identification system and method of the present teaching.

Position-momentum entangled photons possess a continuum of entangled position probabilities defined by their probability wavefunction, which we call a position wave packet. The probabilistic nature of the position-correlated value can be exploited using sub-wavepacket spatial resolution is used. Even with lower spatial resolution, the correlation can be exploited to find correlated photons in space precisely and/or within large background environments. In addition, many entangled photon generators rely on stochastic processes that are themselves random, allowing position-correlated photons to carry random yet correlated position information based on those processes. These features are exploited in various ways for measurement schemes that use embodiments of the time-correlated photon identification system and method of the present teaching.

One feature of some embodiments of the system and method of the present teaching is the ability to identify time-correlated photons without relying on complex, high-resolution time synchronization schemes within the system sharing information. Numerous entanglement experiments use time coincidence counters to verify entanglement and validate the Bell inequality. These experiments rely on time coincidence for entanglement generated by spontaneous parametric down conversion as a valid determinant of entanglement and identification of photons that can carry other entangled state information. However, coincidence counters can be difficult to use in practice. In prior art systems, high-resolution time synchronization is needed. For example, even the length of the wire between the detector and the counter can skew timing. The future success of transition of quantum systems to practice demands systems and methods that can allow the use of quantum "coincidence" detection schemes that practically work in real life systems. The system and method of time-correlated photon identification of the present teaching can address many of these challenges. Some basic operations and examples of the use of time-correlated photons for the identification of quantum information are described in U.S. Provisional Patent Application No. 63/327,892, filed on Apr. 6, 202, entitled "Correlated Quantum State Identification System and Method", which is incorporated herein by reference and assigned to the present assignee.

One feature of the present teaching is that it can use high-brightness single-photon sources to generate time-correlated photons. Some high-brightness sources create large numbers of quantum-entangled, time-correlated photons using Spontaneous Parametric Down Conversion (SPDC). SPDC relies on laser-pumped nonlinear crystals in various configurations. The pumped crystals emit photons that are time correlated. The crystals can also be configured to emit entangled photons in one or more basis which may include polarization, frequency (color) and/or spatial position. The state of a photon emitted in this multi-dimensional quantum state can be measured and represented as having an arrival time, a position, a frequency and/or a polarization.

One example case is a source that generates sets of four time-correlated photons. In addition to the quadruplets, these sources can also emit pairs and singles that are not part of a quadruplet. FIG. 1 illustrates an embodiment of a source 100 that generates time-correlated quadruplets of single photons. A pump laser 102 generates pump light 104 incident on a nonlinear crystal 106. In some embodiments, the source 102 and crystal 106 are configured in a type-II down conversion arrangement. A mirror 108 reflects some of the pump light 104 back toward the crystal 106. In some embodiments, the pump laser 102 is a blue and/or UV laser and the crystal 106 is a Beta-Barium Borate (BBO) or Bismuth Borate (BiBO) crystal. More details of an example of such a source can be found in the reference, Nikolai Kiesel, Christian Schmid, Ulrich Weber, Geza Toth, Otfried Giihne, Rupert Ursin, and Harald Weinfurter, "Experimental Analysis of a Four-Qubit Photon Cluster State," Phys. Rev. Lett. 95, 210502, 2005.

It should be understood that the source 100 of FIG. 1 is just one particular example of a source that can be used with systems according to the present teaching. Many types of single photon sources can be utilized, for example, sources that use type-I and type-0 phase matching, sources that use periodically poled crystals, including lithium niobate and doped lithium niobate poled crystals, and/or sources that rely on nonlinear processes in optical fibers. A variety of crystals and nonlinear materials can be pumped using infrared laser sources, which can be configured, for example, to emit photons in the infrared at wavelengths that are compatible with optical fiber transmission with low loss.

The source 100 can generate four photons simultaneously that emerge in particular directions, labeled a 110, b 112, c 114 and d 116 in FIG. 1, resulting in a quadruplet of time-correlated photons. The emergence angle, or emission direction, is set by a phase matching condition in the crystal 106. It is also possible that pairs of photons can emerge simultaneously along directions a 110 and b 112, which is referred to as forward directions, or direction c 114 and d 116, which is referred to as backward directions, without being part of a quadruplet. However, it is very unlikely that photons will emerge along one forward direction, a 110 or b 112 and one backward direction, c 114 or d 116, simultaneously without being part of a quadruplet. Therefore, the coincidence of any forward direction photon with a backward direction photon can herald a quadruplet with very high probability. This means that by appropriately configuring coincidence determination between different pairs of this particular kind of quadruplet allows identification of quadruplets with high fidelity. The table 118 shows some examples that a coincidence pair from directions a-c indicates a presence of photons from directions b-d in a time-correlated quadruplet, as does a coincidence of b-d photons imply a correlated coincidence of a-c photons. We note that a coherence length of the pump 102 must be sufficiently long that the forward propagating field and the backward propagating field from mirror 108 are coherent at the crystal 106. We also note that generally quadruplets of the present teaching can effectively arise from either so-called double pair emission and from coherent generation of forward and backward pairs in the crystal 106.

Some known sources that generate entangled photons can have those individual entangled photons emerge along a same path or within a same port. That is, all or some of the entangled photons in a set can emerge along a same or similar path and/or at a same port. This is true, for example with numerous waveguide-based sources, polarization sensitive sources and spatial mode sources. These individual photons of a set can be distinguished and/or later separated for individual measurement because they have e.g., distinctive polarizations, colors and/or spatial modes. As such, these sources can also be used in connection with the present teaching as would be clear to those skilled in the art.

In some embodiments, a metadata collector 120 is used to generate metadata about the quantum states. For example, the metadata collector 120 can be connected directly to the pump source 102 and/or to the optical output of the pump 102. The metadata collector can determine a pulse shape and repetition rate that can be used to determine time-windows where the entangled photons may be found. The metadata collector 120 can determine other information that relates to the quantum states generated by the interaction of the pump in the crystal 106, including for example, polarization, power, pulse width, amplitude and phase noise, and other information about the pump that contribute to the quantum states that are generated.

In some embodiments, the metadata collector 120 is collecting wavefunction information about the quantum states being generated in the crystal. For example, the metadata collector 120 determines specifics of the optical signals and the associated modes that pump the crystal 106 that yields information about when, where, and in what spatial condition, the entangled photons emerge from the crystal. As a simple, but important example, during time periods when there is no pump signal applied to the non-linear crystal, no entangled photons will emerge. Other examples of wavefunction metadata that can be collected include, for example, polarization, frequency, and phase properties of the photons as well as deterministic time windows of their emergence.

We may refer to pairs of a quadruplet that provide a higher probability of indicating a quadruplet as preferred pairs. We note that the description herein of high-fidelity indication of quadruplets by measurement of preferred pairs is provided for coincidences of photons that emerge from a crystal in different directions, forward and backward. Specifically, a forward emerging photon and a backward emerging photon are a preferred pair. However, systems and methods of the present teaching are not so limited. Generally, systems of the present teaching can utilize coincidence measurements of pairs of a quadruplet that herald that quadruplet with a high probability (preferred pairs) as compared to measurements of different pairs of that same quadruplet. This would be true, for example, for systems that had certain phase matching conditions that were specific to the quadruplet generation and not shared with phase matching conditions of pair generation. Additionally, some embodiments do not have preferred pairs generated, and/or do not use preferred pairs, and, thus, coincidence of any pair in the quadruplet can be used to identify the quadruplet. This can be done, for example, using sources that produce low background rates of singles and/or pairs together with producing quadruplets at a high rate.

One feature of the present teaching is that identification of pairs from a quadruplet can be used to identify all members of the quadruplet. This allows sharing of quantum information associated with measurements of photons in that quadruplet. The sharing can include exchanging of information from measurements of the entangled resources that is arranged in ordered lists. These lists can be the same or similar to lists that are used to identify entanglement and share quantum information using entangled pairs of photons. Some example identification methods and systems, and also associated applications that utilize identification, have been disclosed in U.S. patent application Ser. No. 17/465,235, entitled "Method for Synchronizing and Locking Clocks", which is incorporated herein by reference and assigned to the present assignee. It is important to note that some embodiments of the present teaching do not generate lists at all, and rather the photon measurements and/or coincidence measurements are used in nominally real time or time offsets from real time, rather than being arranged and stored in lists for post processing. However, many properties of the elements of lists and associated correlation properties carry over to the real-time operation. Examples of real time operation can include a local finding of a coincidence pair in a set being used immediately or simultaneously to direct a measurement or read or store a value associated with measurement of another photon or pair of photons in that same set.

While configurations for identifying quadruplets based on pairs is described herein, the present teaching is not so limited to this description. Using the methods and apparatus of the present teaching, subsets of various numbers of photons of sets of various numbers of time-correlated photons can be used to identify the sets of time-correlated photons in various embodiments of the system and method for identifying time-correlated photons of the present teaching.

Figure 2A:
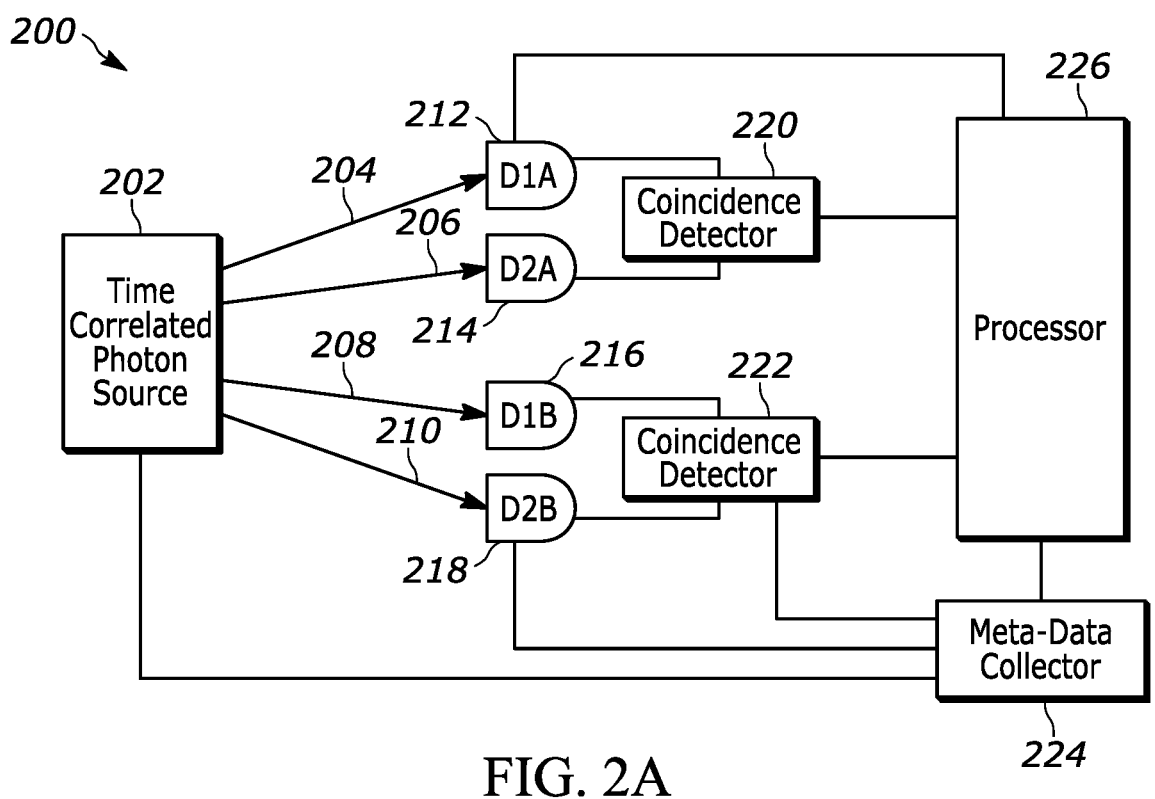
FIG. 2A illustrates an embodiment of a system for generating and measuring time-correlated quadruplets of the present teaching.

FIG. 2A illustrates an embodiment of a system for generating and measuring time-correlated quadruplets of the present teaching. A time-correlated photon source 202 generates four time-correlated photons that emerge at four outputs and follow four paths, 204, 206, 208, 210 to four detectors 212, 214, 216, 218. The paths 204, 206, 208, 210 can be free space paths or any type of guided paths, such as optical fiber paths and other optical waveguide paths. Two detectors 212, 214 are connected to a coincidence detector 220, and two other detectors 216, 218 are connected to another coincidence detector 222.

In the system 200, the source 202 produces four photons simultaneously. In some embodiments, two of the photons are directed to one location that includes the two detectors D1A 212 and D2A 214, and two photons are directed to a second location that includes two detectors D1B 216 and D2B 218. There is at least one local coincidence detector 220 at the location that includes D1A 212 and D2A 214, and a second local coincidence detector 222 at the location that includes two detectors D1B 216 and D2B 218. In some embodiments, the local coincidence detector can be as simple as a AND logic gate.

When the coincidence detector 220 finds a local coincidence at the location that includes D1A 212 and D2A 214 (in other words, determines there are simultaneous detection events at D1A 212 and D2A 214), a time-correlated photon pair has arrived. We note that the description assumes equal time-of-flight (TOF) from source 202 to detectors 212, 214, 216, 218 of each photon. The time correlation of sets of entangled photons ensures that when the location that includes D1A 212 and D2A 214 detects a local coincidence, the location that includes two detectors D1B 216 and D2B 218 will also detect a local coincidence. As mentioned before, much of the description herein assumes that latency from source to detector(s) is managed such that "coincidence" is synonymous with simultaneity.

As understood by those skilled in the art, various known approaches to addressing differences in latency from source to measurement can be used in keeping with the systems and methods for identifying time-correlated photons in distributed systems of the present teaching. For example, if the time-of-flight is longer on link 204 than 206, or link 208 than 210, the coincidence detector can be preceded by a fixed time delay in the connection between D1A or D1B to the coincidence detector. So more generally the concept of coincidence embodied herein allows for the use of known methods and systems at the receivers and receiver nodes that correct for any TOF, detection time, or any other differential latency in the system that is delivering and measuring the photons that carry the quantum correlated states. In fact, in some embodiments, systems and methods of identifying time-correlated photons can be used to determine and correct some latency differences from source to detector(s).

That is, identifying time-correlated photons includes compensating for time delays in the determination of the coincidence. The time delays can include, for example time-of-flight delays of electromagnetic waves, detection latency, various circuit latency, optical measurement latency, etc.

Detecting a local coincidence at the location that includes both D1A 212 and D2A 214 means that two detectors D1B 216 and D2B 218 will detect a local coincidence. In some methods according to the present teaching, two locations construct ordered lists of measurements of time-correlated events that match without exchanging any classical data. No common quantum state basis is needed to identify coincidences. In some embodiments, times between arrivals of time-correlated photons is used to produce a shared random number, and there is no need to share any information between locations to accumulate the shared number. In some embodiments, measurements of additional entangled basis information carried by the time-correlated photons is shared information and there is no need to exchange any information between nodes to accumulate this shared entangled state information. For example, polarization and/or position information can be shared in this way.

In some embodiments, one or both of the coincidence detectors 220, 222 are connected to a processor 226, that can be one processor or multiple processors that can also be distributed. This supports the processor 226 generating event lists that include coincident determinations from one or both of the coincidence detectors 220, 222. Those lists may be formulated as time stamps, marks in time bins, or other formats. In some embodiments one or more of the detectors 212, 214, 216, 218 are connected to the processor 226 (only one connection shown). This supports the processor 226 generating event lists that include single photon detection measurements, that would typically also include background counts events, of the one or more of the connected detectors 212, 214, 216, 218. Those lists may be formulated as time stamps, marks in time bins, or other formats. Those lists may be in order of arrival time, as referred to as ordered event lists or lists of ordered measured events.

In some embodiments, one or more of the photon sources 202, one or more detectors 212, 214, 216, 218 (only one connection shown), one or two coincidence detectors 220, 222 (only one connection shown) can be connected to a metadata collector 224 that is connected to processor 226. This supports the processor 226 generating metadata information lists. The lists can include, for example, one or more of number of coincidences in a time window, time-windows of expected entangled pairs based on pump pulse information, background counts or expected background levels based on detector bias point, measurement start and stop times in some coordinated time frame, quantum state coherence levels (including deterministic and probabilistic values or estimates), various wavefunction information, and many other kinds of information.

A distinction is made between metadata, which is information about the quantum states, and quantum state measurement information or values (quantum data), is that a quantum measurement collapses the quantum state, whereas metadata can be collected without collapsing the state. As one example, this feature allows the quantum privacy of a superposition basis of an entangled system to be kept locally, while the other information is shared publicly to support privacy and security applications. As another example, this feature allows multiple different kinds of entanglement sharing applications to identify entanglement while sharing small amounts of data about the entanglement. In some cases, the measured quantum state information can carry a high capacity of information, if it is part of a high-dimensional quantum basis, and the information exchanged to "tap" this capacity can be small. As one particular example, a number of coincidences, which is a single number, can be used to verify many precisely measured time-entangled photon (or even just one). For example, the resulting shared timestamp values that represent the measured quantum state value of these entangled photons can represent a lot of information, as depends on the application.

It is important to note the generality of the sharing of the metadata and the sharing of the quantum entangled states according to the present teaching. Different applications would be constructed and would use different combinations of these measurements, lists and sharing methods in different ways. Some examples are presented herein. However, it will be clear to those skilled in the art that numerous systems and methods can benefit from and use the association of the metadata and the measured quantum state data to share and derive quantum entangled state information. For example, the method and system according to the present teaching is applicable to distributed systems, localized systems and hybrids of localized and distributed. The method and system can be applied to privacy systems, key distribution systems, measurement systems, coding and communication systems, location systems, synchronization systems and many other kinds of systems that use entangled quantum state information. Embodiments of the system and method that use the associated metadata can, for example, help reduce information sharing requirements, enhance privacy and security, improve accuracy, reduce latency, and/or support high background count operations while sharing quantum state information as compared to systems that rely on sharing of quantum state information alone.

In some embodiments, lists of measurement event information generated in two separated locations that is associated with the coincident photons determined in each location is shared information between those locations with no classical information exchange. The lists can include, for example, arrival times of coincidence photons. The lists can be ordered by time of arrival. Time can be secretly shared because no classical time information is shared between the nodes.

Additionally, latency can be reduced since there is no waiting for a classical exchange to find coincidences or to otherwise establish the time-correlation and/or phase-correlation property and associated shared time and/or phase information of a photon that belongs to a quadruplet. Most practical systems will benefit from "starting" the accumulation of both lists at roughly the same time (as determined by a common reference). However, since coincidences in real systems tend to occur at low rates (e.g., milliseconds), the accuracy of this "start" time can be low. Importantly, in some configurations, simple free running clocks can be used in each location. In some configurations, a common time reference and/or start time can be resolved simply by energizing, shuttering, or otherwise time-stamping the entangled source until ready to effectively "start" both lists at the time entangled photons start to arrive at both locations.

In some embodiments of the present teaching, the state dimension of the time basis is dependent on the clock resolution at each detector pair. The clocks can be running at nominally the same rate, to an accuracy that provides a desired resolution. If the time basis is a time between arrivals, delta-t, absolute time is only relevant to insure both detectors start their ordered list with the same event making absolute time irrelevant and clock accuracy requirements only relevant for short inter-arrival times. Not requiring accurate absolute time and synchronizing of absolute time is highly advantageous for many applications.

One feature of the present teaching is that the amount of classical information shared between locations can vary as desired or required by a particular application. In some embodiments, the classical information shared is the quantum metadata that is quantum data in a classical form associated with the quantum state information. Varying the amount of classical information shared can also be expressed as varying the level of classical isolation of the two locations. For example, the isolation can be complete, with no classical information shared, or the isolation can be partial with some information shared depending on the particular application. As described above, by using coincidence of pairs of quadruplet time-correlated photons, time and other quantum state information can be shared between locations without any need to send any classical information about the measured states. In various embodiments, different amounts of information about the measured quantum states, and associated lists of measured state information can be shared. Information about the measured quantum states that is not a value of one or more of the measured states may be referred to as metadata as described herein.

Figure 2B:
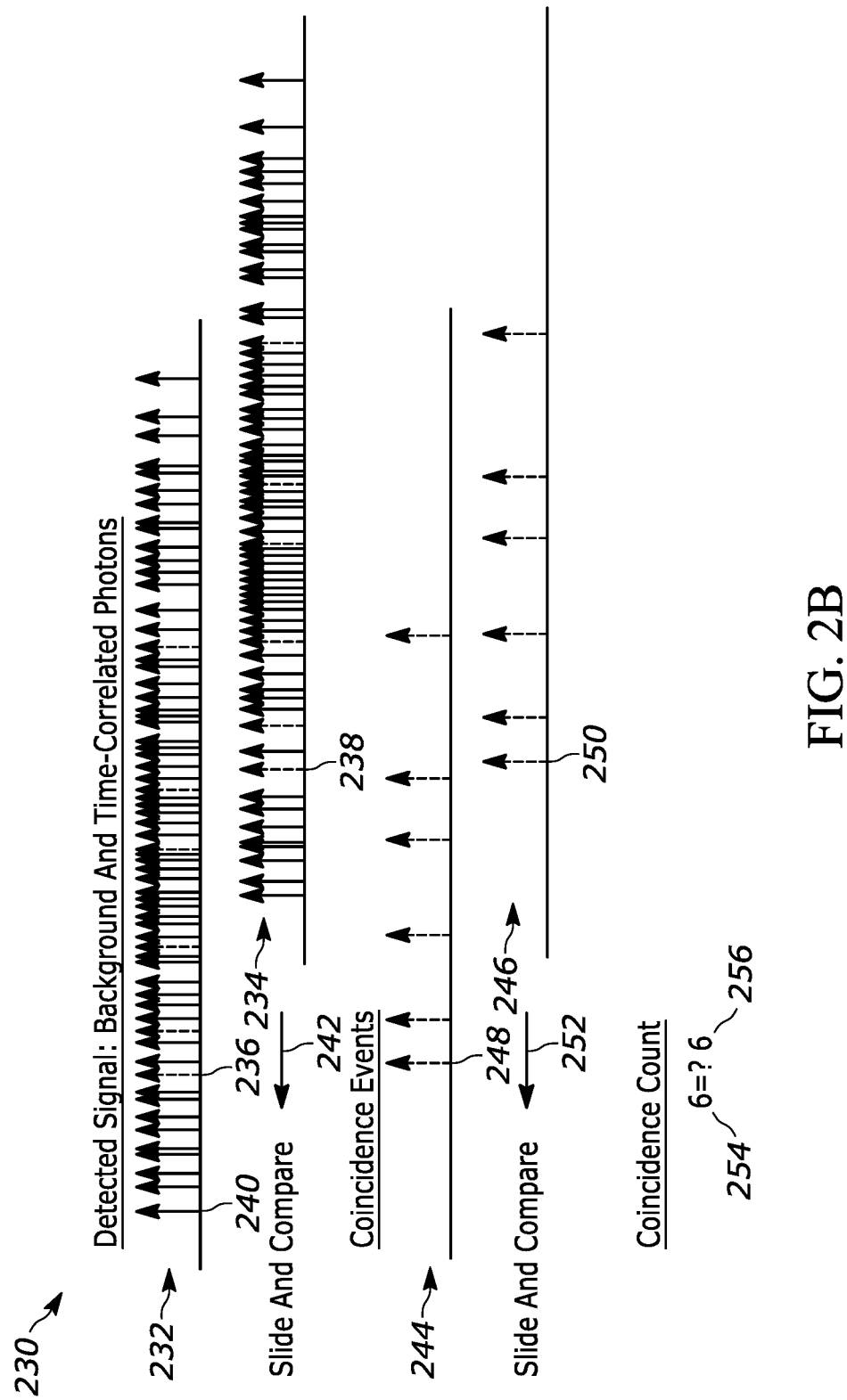
FIG. 2B illustrates embodiments of measured event lists that can be used in systems and methods of sharing quantum information using time-correlated single photons of the present teaching.

FIG. 2B illustrates examples of measured event lists 230 that can be used for some embodiments of a system and method of sharing quantum information using time-correlated single photons of the present teaching. In some embodiments, a detected signal list 232, 234 of all measured photons at a detector as a function of time is generated. A detected signal list 232, 234 could be generated, for example, using the measurements from any one of the detectors 212, 214, 216, 218 described in connection with FIG. 2A. The lists can include measured events that are not associated with a time correlated photon, such as background count measurements. While in general, there is no discernable difference between measured events from correlated and background photons and/or detector dark counts, the lists 232, 234 illustrate time-correlated photons, e.g., event 236 of list 232 and event 238 of list 234 as a dotted line for clarity. Other measured background events from, e.g., background photons and dark counts, are shown with a solid line 240.

Systems using time-correlated photons look for coincidences in time at two different detectors. The background events align in time at different detectors only by chance. For uniform background arrivals with a known rate, it is possible to calculate the probability that these background events align in time. To the extent a reference time exists between nodes and flight and detection time latency from source to detector are taken into account, the arrival time of time correlated photon events 236, 238 in the two lists 232, 234 is the same. Regardless of relative time, time correlated photon arrival events occur with exactly the same time difference (within measurement error) between events if the two clocks run at the same rate. As such, by sliding and comparing the two lists as a function of time, represented by arrow 242, relative time between the two detectors can be determined. By sliding we mean comparing the two lists at each of a series of different time shifts between the two lists. By comparing we mean adding the number of matches per relative time position of the shift. So together by sliding and comparing we are able to generate a cross-correlation of the two lists.

A peak, with nominally the value of all the time-correlated photons (six in the example) will result at the matched position caused by the sliding, and be lower at other relative time position. The sliding and counting matches at various positions can provide a cross-correlation of the two lists 232, 234. As understood by those skilled in the art, cross-correlation can determine a similarity between two data sets, or two lists of events.

In some methods, coincidence event lists 244, 246 are generated. These may be generated, for example, from the output of the coincidence detector 220 and coincidence detector 222 described in connection with FIG. 2A. In some methods, coincidence lists 244, 246 can be generated by cross correlation and then producing a list of the times of matched events associated with the peak of the correlation. In some methods, only coincidence events from the detector 220 are listed as a function of time. If both a reference time and a clock rate of the two coincidence detectors 220, 222 are synchronized, each list is the same and represents shared information. This method benefits over a case that includes background counts in the shared lists because the lists are reduced to contain only coincidence events, which in many practical systems is several orders of magnitude less than all events. As such, the size of a message containing the list is smaller and/or the amount of data to be processed during analysis of a list is less.

In methods where the reference time and/or clock rate synchronization is unknown, these lists can be shared, and a slide and compare operation, which is represented by arrow 252, can be performed on the coincidence event lists 244, 246 to provide information to synchronize clocks in the two locations. See, for example, U.S. patent application Ser. No. 17/465,235 entitled Method for Synchronizing and Locking Clocks, which presents additional details, applications and systems and methods for sharing quantum information using event lists.

In some methods, coincidence counts 254, 256 are generated. This kind of information about the measured events having no state value information is referred to herein as quantum metadata because this type of metadata is related to quantum state information, but does not contain any actual measured quantum state information. This quantum related metadata can be a number of the coincidence counts in a set time window generated at the output of the coincidence detector 220 and coincidence detector 222, which was described in connection with FIG. 2A. In this case, number 6 shown as 254, and number 6 shown as 256 are generated. These numbers are compared and determined to be equal, which provides a high likelihood that the coincidence events are not in error, for example an error caused by the loss of one or more photons, and the shared information about the coincidences is good information. As such, one feature of the present teaching is that the sharing of a number that has no meaning outside the two systems that are sharing that number, can be used to improve the fidelity of the shared information between the two systems.

Figure 2C:
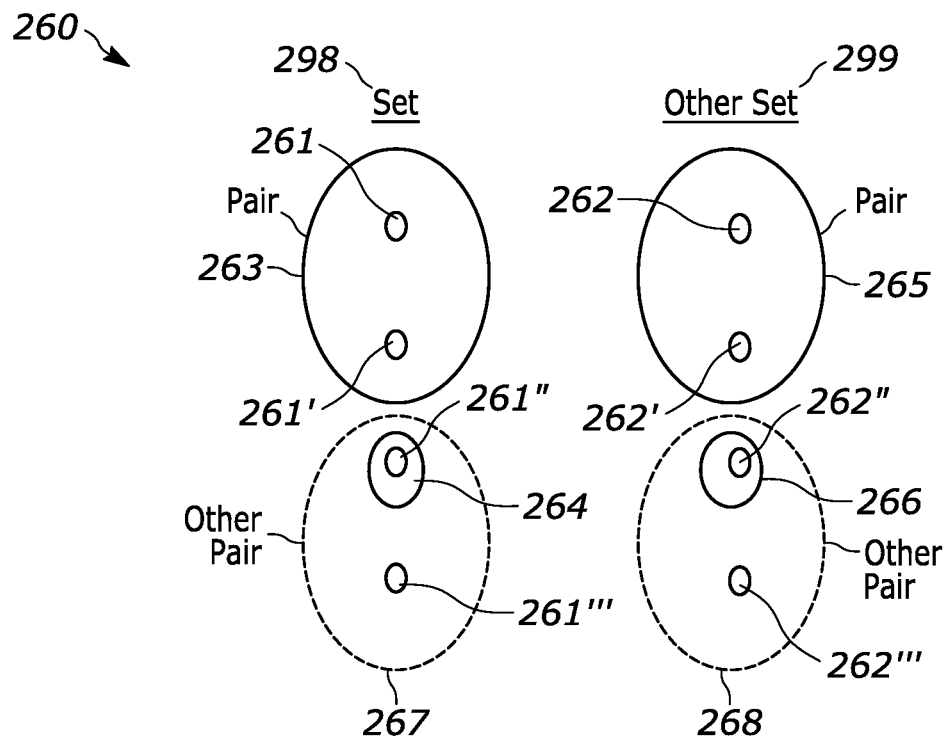
FIG. 2C illustrates a schematic diagram of entangled photon sets for the system and method for sharing quantum information using time-correlated single photons of the present teaching.

FIG. 2C illustrates a schematic diagram 260 of entangled photon sets 298, 299 used in embodiments of a system and method for sharing quantum information using time-correlated single photons of the present teaching. The diagram 260 illustrates an example for quadruplets (four) of entangled time-correlated photons, and shows just two sets 298, 299 of quadruplets for clarity. Typically, streams of many entangled photon sets are generated over time. In addition, more, or less, than four photons in a set of entangled photons can be used.

One set 298 of entangled photons includes four photons 261, 261', 261", 261'''. The set 298 of four photons 261, 261', 261", 261''' is shown aligned vertically to suggest how they are time-correlated, that is they originate at a common time.

The other set 299 of entangled photons includes four photons 262, 262', 262", 262'". The other set 299 of four photons 262, 262', 262", 262'" is also shown aligned vertically to suggest how the photons 262, 262', 262", 262' are time-correlated, that is they originate at a common time. The common time for the two sets 298, 299 is different since they are generated at different times. It should be understood that background photons, while commonly present are not shown in the diagram 260 for clarity.

One feature of the present teaching is the recognition that the set 298 of four entangled photons 261, 261', 261", 261'" are all correlated in time and so one pair 263 of photons 261, 261' of the set 298 of four entangled photons being correlated in time indicates that all four photons 261, 261', 261", 261'" of the set 298 of four entangled photons are entangled. This is an important feature that allows, for example, exploitation of the non-local and/or high precision features of the time correlation that crosses all four photons 261, 261', 261", 261'. This is possible because sets 298, 299 of four entangled photons that are time correlated can be determined by coincidence determination of only two photons in the set. For example, coincidence of pair 263, and/or coincidence of pair 267, identify set 298. Likewise, coincidence of pair 265, and/or coincidence of pair 268, identify set 299. This identification then enables the exploitation of some or all of the entangled state information that is carried by the set 298, 299. That is, just determining that a pair is correlated indicates that all four photons are correlated. More generally, determining a subset of photons in an entangled set is correlated indicates another subset, or subsets, of the same set are correlated.

As such, some embodiments of a method of the present teaching determine a coincidence of the one pair 263 of photons of the set 298 of four entangled photons 261, 261', 261", 261'" and also detect at least one photon 264/261" that is not in the pair 263 of photons of the set 298 of four entangled photons 261, 261', 261", 261'. The detection of the one photon 261" can be, for example, a simple indication that a detection event occurred. The indication may be a mark in a time bin associated with the detection of the photon 261". The detection can be configured to generate additional state information about the photon 261". For example, a detection event can include additional measured quantum state information carried by the detected photon, including a precision time of arrival, polarization, wavelength, phase and/or position of the detected photon. This additional state information can be realized, for example, if the quadruplet is hyper-entangled in multiple bases, and the detection event is made appropriately sensitive to the hyper-entangled bases.

By detecting a photon, we mean generally making a measurement of one or more of the quantum states being carried by that photon. An example of detecting is one or more of measuring a time of arrival of a single photon, measuring a polarization of a single photon, measuring a wavelength of a single photon and/or measuring a position of a single photon. Measuring single photons can be done using known single photon detectors, including various photo multiplier devices, avalanche photodiodes, Geiger mode detectors and other single photon detectors. Other state information can be determined in the measurement, for example using various optical analyzers before a single photon detector or detectors. Thus, detecting one or more properties of a single photon can require use of more than one single photon detector. Importantly, a detection of a single photon is a singular measurement event and all properties that are derived from that measurement event are tagged to that particular photon. In this way, a so-called detection of a photon can produce multiple state values.

The method continues by determining that the at least one photon 264 from the other pair 267 of the set of four entangled photons 261, 261', 261", 261'" is entangled using the coincidence of the one pair 263 of photons of the set 298 of four entangled photons. Thus, the entanglement of the set 298 of four entangled photons is identified from the coincidence of the one pair 263 of photons of the set of four entangled photons.

Stated another way one aspect of the present teaching is the highly useful concept that knowledge of entanglement of all four photons can be determined from the detection of only two. This capability serves to separate, or make independent, an identification of an entangled set of photons, and other measures of quantum state information of at least some other photons in the set of entangled photons. For example, it is possible that some photons in an entangled set are used to identify the entangled set, and other photons are used to derive or exploit other quantum information of that entangled set. That is, once an entangled state is identified by determining coincidence of pair 263, it is possible to exploit entangled quantum state information that is carried by, for example, the single photon 264 after its measurement or, more generally, any other subset of photons in the set 298.

The identification method can be used, for example, in a system where the determination of the coincidence of pair 263 is used to herald the entangled photon 264. The identification can be used, for example, to synchronize a clock that is part of or connected to a system that is determining the coincidence of pair 263 and another clock that is part of or connected to a system that is detecting the photon 264. Numerous synchronization configurations and performance parameters can utilize this method.

The identification method can be used in real time or essentially real time, assuming sufficient attention is given to delays and time-synchronization for both the coincidence determination and the photon measurement/detection. The identification method can also be used in non-real time. In non-real-time systems, measurements are made at one time or over different times, and then subsequently analyzed and/or compared. Time-correlation identification and entangled state information derived from the combination of the coincidence determination and the detected photon 264 are determined and/or exploited at some point after one or both of the measurements are completed. This can be done if the information about the coincidence determination and/or the detection events are kept in lists that represent the measurement events or contain the measurement information that is pertinent to identification. The lists are then subsequently used for analysis and/or comparison to identify entanglement and/or to determine quantum state information.

In some methods, the pair 263 is sent to one location, measured and processed to determine coincidence in one location and the other photons in the set 298, including at least the detected photon 264, are sent to a different location for the detection. In these cases, the lists containing measured event information that are generated in the two locations can be shared or exchanged, e.g., over a network or other classical communication link.

In general, various lists described in connection with the present teaching, such as, for example, the lists described in connection with FIG. 2B, will contain information about numerous entangled set elements as well as background counts and measurements of photons that are not part of entangled sets.

Key features of the generated lists can be understood by distilling down to just two entangled set elements shown in the diagram 260 of FIG. 2C. The diagram 260 shows the other set 299 of photons 262, 262', 262", 262'" that include a pair 265 of photons 262, 262' and also a single photon 266, photon 262', of the other pair 268 of photons 262", 262'".

Some embodiments of the method of the present teaching generate a set 298 of entangled photons 261, 261', 261", 261'", and then determine a coincidence of one pair 263 of photons 261, 261', and detect one photon 264 of the other pair 267. It is therefore determined by the coincidence event that the detected one photon 264 of the other pair 267 is entangled in the set 298. As such, the determination of coincidence of pair 263, which can potentially be completely independent of the detection event of detected photon 264, identifies that entanglement status. This same process is repeated for the other set 299 of photons 262, 262', 262", 262'". The set 299 is generated, a coincidence of one pair 265 of photons 262, 262' is determined, and a measurement of a photon 266 of the other pair 268 of the set of entangled photons 262, 262', 262", 262' is performed.

After generation and measurement of both sets 298 and 299 of photons, based on the determined coincidences, a first list of state values corresponding to both the identified set 298 of four entangled photons 261, 261', 261", 261' and also the identified other set 299 of four entangled photons 262, 262', 262", 262'" is generated. In this simple two-set example, the list can include, for example, two entries that are a determined coincidence time for each set 298, 299. This list can be presented or stored in numerous ways. The list can be marks in regularly spaced time bins that indicate the time-bin corresponding to when the coincidence determination is made. The list can also, or in addition, be presented as timestamps of the coincidence determinations. The list can also, or in addition, include additional state values, such as the difference in arrival time between the two determined coincidences, a polarization value, a wavelength value, a spatial position, or a phase value associated the pairs 263, 265. Lists can also be generated to include measured values of some or all of the individual photons 261, 261', 261", 262, 262', 262" as dictated by the application. The particular content of a list can be based on the particular application's need as well as the specific system and method used for the measurements, detections and coincidence determinations.

One feature of the present teaching is that two, potentially widely geographically separated and/or classically isolated, coincidence determinations of different pairs in a set of entangled photons provide an effectively latency free, or non-local, sharing of quantum information carried by (or contained within) the entangled set. Thus, a determined coincidence of the other pair 267 of photons 261", 261'" of the set 298 of four entangled photons 261, 261', 261", 261'" identifies the entanglement of the set 298 of four entangled photons 261, 261', 261", 261'" and a determined coincidence of the other pair 268 of photons 262", 262'" of the other set 299 of four entangled photons 262, 262', 262", 262'" identifies the entanglement of the other set 299 of four entangled photons 262, 262', 262", 262'". A second list of state values corresponding to both the identified set 298 of four entangled photons 261, 261', 261", 261'" and also the identified other set 299 of four entangled photons 262, 262', 262", 262'" is generated that is based on the determined coincidence of the other pairs 267, 268.

This second list is based on measurements of different pairs than the first list, however, the first list of state values and the second list of state values are correlated. That is, a first list is generated by measurements of pair 263 of photons 261, 261' of one set 298 of entangled photons 261, 261', 261", 261'" and by measurements of pair 265 of photons 262, 262' of the other set 299 of entangled photons 262, 262', 262", 262'". The second list is generated by measurements and coincidence determinations of the other pair 267 of photons 261", 261'" of one set 298 of entangled photons 261, 261', 261", 261'" and by measurements and coincidence determinations of the other pair 268 of photons 262", 262'" of the other set 299 of entangled photons 262, 262', 262", 262".

In some embodiments, these measurements of the detections and coincidence determinations that contribute to the first and second lists are performed in one localized node and/or with one clock providing timing. In other embodiments, these measurements of the detections and determinations are performed in more than one node and/or with more than one clock providing timing.

Figure 2D:
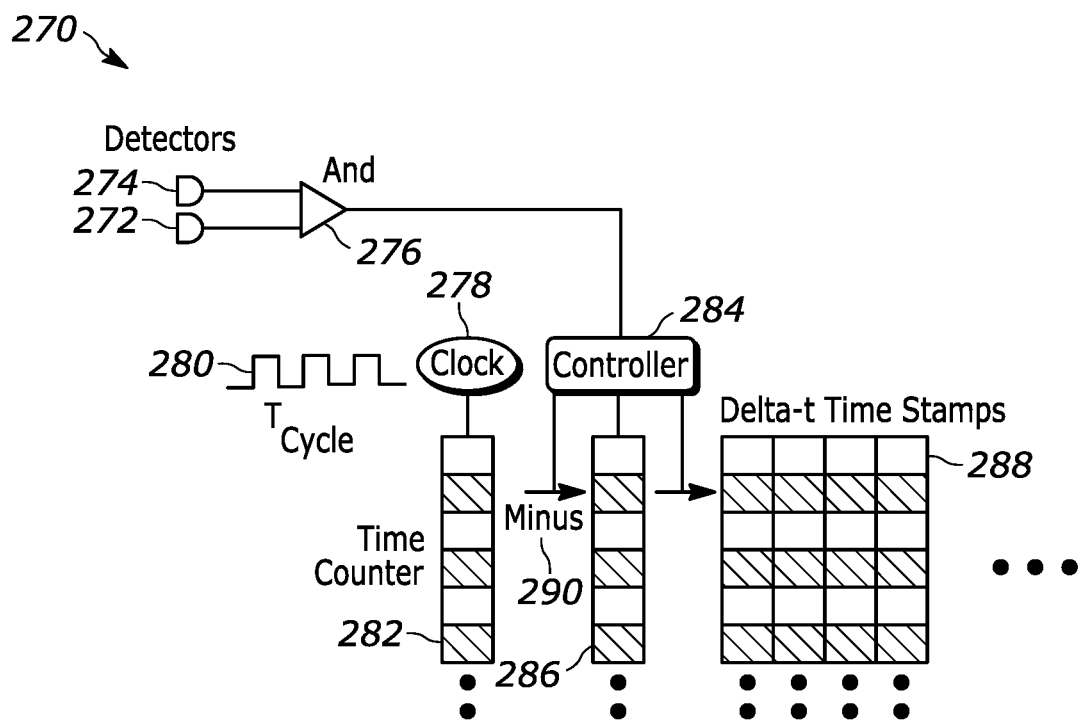
FIG. 2D illustrates an embodiment of a receiver for measuring a pair from time-correlated quadruplets of the present teaching.

One feature of the present teaching is that the hardware and processing needed to determine coincidence and/or measure state information of photons can be constructed using relatively simple and low-cost components. FIG. 2D illustrates an embodiment of a receiver 270 for measuring a pair from time-correlated quadruplets of the present teaching. The receiver 270 can be used, for example, as an implementation of detectors 212, 214 and coincidence detector 220, and/or an implementation of detectors 216, 218 and coincidence detector 222 as described in connection with FIG. 2A. Detectors 272, 274 generate an electrical signal in response to receipt of time-correlated photons, and may also generate electrical signals in response to background. The detectors can be configured so the electrical signal is high when a photon is detected. The outputs of detectors 272, 274 are input to two inputs of a logical AND gate 276. Time-correlated photons will cause the AND gate 276 to generate a high signal because both inputs are high. A clock 278 in the receiver generates a clock waveform 280 with a cycle time Tcyde. The clock produces time stamps 282 each cycle. A controller 284 can move a stamp 286 to a buffer 288 when the output of the AND gate 276 is high to store a list of timestamps of coincidences. The controller 284 can determine a difference 290 between time stamps at two high-values from the output of the AND gate 276 to the buffer 288 and a delta-T timestamp list is generated.

Figure 3A:
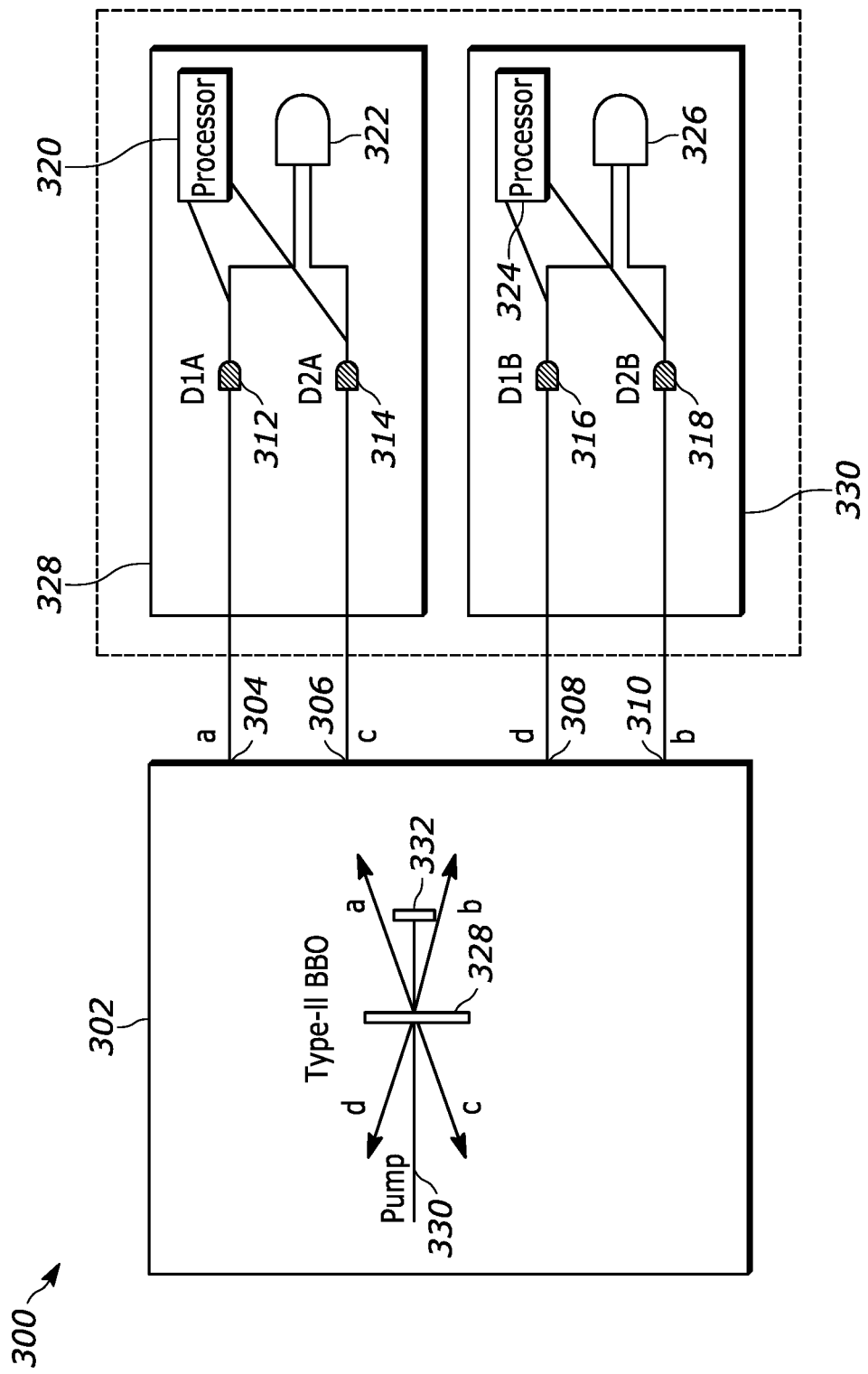
FIG. 3A illustrates an embodiment of a system for sharing quantum information using time-correlated single photons generated by a SPDC source according to the present teaching.

Some embodiments of the time-correlated photon identification system of the present teaching use an AND logic gate and processing to determine shared quantum information from time-correlated quadruplets. FIG. 3A illustrates an embodiment of a system 300 for sharing quantum information using time-correlated single photons generated by a SPDC source of the present teaching. The source 302 generates four streams of photons that include at least some time-correlated photons at outputs labeled a 304, b 310, c 306 and d 308. The source 302 can be, for example, the source 100 described in connection with FIG. 1. These outputs are each optically connected to detectors 312, 314, 316, 318. One pair of detectors 312, 314 has outputs connected to a processor 320 and an AND gate 322. Another pair of detectors 316, 318 has outputs connected to a processor 324 and an AND gate 326. The outputs a 304 and c 306 can be optically connected to a node 328 that is physically distinct from a node 330 connected to outputs d 308 and b 310. As described in connection with FIG. 1, a feature of the source 302, is that a coincidence that can be found through the AND operation of the gates 322, 326 in either node 328, 330 has a very high likelihood of indicating a correlated quadruplet of four photons emerging from a 304, c 306 d 308 and b 310.

In some embodiments a BBO crystal 328 is energized with a pump laser beam 330 that is reflected back at the BBO crystal 328 by a mirror 332. The resulting output along directions of a, b, c, and d includes various singles, doubles (pairs) and quadruplets that are time correlated photons. The allowed states of this system are as follows: 1) random single photons at arbitrary times at a, b, d, and c; 2) two-way coincidences at a and b only; 3) two-way coincidences at d and c only; and 4) four-way coincidences at a, b, d and c. Excluded states of this system are as follows: 1) two-way coincidence at a and c without a coincidence at d and b; 2) two-way coincidence at b and d without a coincidence at a and c; 3) three-way coincidence at a, c and d without a coincidence at b; 4) three-way coincidence at a, c and b without a coincidence at d; 5) three-way coincidence at d, b and a without a coincidence at c; and 6) three-way coincidence at d, b and c without a coincidence at a.

In this embodiment of the system 300, by carefully choosing the pairings of a, c, d, and b from the source 302, we can guarantee with a high likelihood that if a and c see a coincidence, d and b will see a coincidence.

FIG. 3B illustrates a table of cases for an event list associated with an embodiment of the system for sharing quantum information using time-correlated single photons of FIG. 3A. In general, an event is registered either for a random or a time-correlated (marked coincidence) photon to be registered at each of outputs a, b, c and d. Allowed cases are random events at a, b, c and d, coincidences at a and b (entangle pairs), coincidences at c and d (entangle pairs) and coincidences at a, b, c and d (quadruplet). The other cases are not allowed.

FIG. 3C illustrates a table 370 of lost photons and false coincidences for an embodiment of the system for sharing quantum information using time-correlated single photons of FIG. 3A. This table 370 columns refers to detectors described in connection with FIG. 3A. It should be understood that the more likely "error" scenario for a quadruplet is lost photons. That is, although a quadruplet is present at the source outputs a, b, c and d, in the quantum channel to nodes 328, 330 one or more of the entangled photons are lost in the channel on the way to the detector or as a result of imperfections in the detector itself. If detector D1A 312 "looses" a photon, but D1B 316 and D2B 318 do not lose a photon, the node 330 will assume that it has time-correlated photons and will add the information detected to its ordered list, but node 328 will not, and the ordered lists will no longer match up. But if D2A 314 loses a photon, and D1B 316 loses a photon, neither node 328 or node 330 will add to their ordered list, so no errors are incurred (a detected error) although a time-correlated event is lost. The table 370 outlines when an undetectable error would occur, which is 6/16 possible combinations.

There are various ways to compensate for lost time-correlated events. For example, various methods for compensating for lost time-correlated events include using a classical channel for error detection and/or correction. However, unlike a two-way entangled situation, a classical channel can be used to detect and/or correct these errors with a minimum of information exchange (low bandwidth) for time-correlated quadruplets.

In one method of error correction and/or detection, nodes 328, 330 keep a running count of coincidences and periodically share their numbers through a classical channel. This is a type of parity error checking and correction but does not require the use of additional signal. In one method, the numbers do not match, the nodes 328, 330 know photons have been missed. The nodes 328, 330 know that the difference between counts equals the number of missed photons, and the detector with the lower number is the one with missing counts. One bandwidth-efficient method to manage this would be to exchange counts at a rate approximately equal to the expected loss rate making the probability of a single lost photon during a counting interval equal to 0.5. If the counts match, the lists necessarily match. If the counts do not match, at least one missing photon case is identified.

If there is a missing photon, both nodes 328, 330 could purge their lists for the interval since the last matching count exchange as a way of improving accuracy. Alternatively, nodes 328, 330 could exchange their counts for half the list, and see if the counters match. If the counters match, then each node tries for three-quarters of the list. If the counters do not match, then each node tries for one-quarter of the list. Successively cutting the remaining list in half, or doubling it, until the counts match, allows identification of additional time-correlated photons that might otherwise be discarded.

There are many other ways to detect and correct errors with a low information rate classical exchange. For example, the nodes 328, 330 could share polarization values, but keep time of arrival as a shared secret. This is highly valuable given the large state dimension that can be realized with time. For example, time can be measured to very high accuracy, for example, picosecond or higher. As such, a value with many digits of precision can be shared for each measured entangled set as compared with polarization, which may have only two bits of precision. If polarization values do not match, the most likely reason would be a lost photon as described above. Because both these bases are carried by the same entangled photon set, low-bit value polarization values can be used to improve the accuracy of the large number of bits time value sharing.

As another example of a method of detecting and correcting errors, 328 and 330 can share their list of coincidence event time stamps or combs. Any missing coincidences are discarded. As yet another example of a method of detecting and correcting errors, quantum metadata that is wavefunction data that indicates particular time windows where entangled photons are not generated is used to discard any measured state values that are found in that window.

The various approaches for determining an error condition, including lost photon error conditions, and correcting those error conditions described herein are general, and apply whether the measured photons and/or determined coincidences processes are performed in a same location or different location. As such, they can apply to the various embodiments of entangled state identification for quantum imaging described herein, including those embodiments described in connection with FIGS. 5A-B, 6 and 7, described further below.

One feature of the present teaching is that it can be easy and cheap to build a local coincidence detector that is very accurate in measuring coincidences in short time windows. This measurement accuracy will drive the error rate due to false entanglement low. The more likely errors in time correlated quadruplets are related to lost photons. If loss is low, it is possible to build a system with no classical channel between nodes 328, 330. If loss is higher, it is possible build error detection and correction schemes that share information between processors 320, 324 in nodes 328, 330 that require only a very low information transfer rate, as compared, for example, to systems that exchange information using pairs of time correlated photons only.

The probability of error caused by singles arriving simultaneously (false coincidences) at D1A 312 and D2A 314 or D1B 316 and D2B 318 is limited by the speed of the local coincidence detector which effectively determines the equivalent resolution of time stamps or size of time bins. The exact formulas have been derived for pairs, see, for example U.S. patent application Ser. No. 17/465,235, entitled "Method for Synchronizing and Locking Clocks". Low cost, high speed AND logic gates which can be used to detect coincidence are widely available, for example, the 74VHCT08A from Fairchild Semiconductor is specified to run at 5 ns and costs $0.10. With a 5 ns window, the expected value of a false coincidences per second (false entanglement) in a system generating 10,000 singles per second is given by:

$$10,000 * \left(\frac{10,000}{1/(5*10^{-9})}\right)^2 = 2.5 * 10^{-5}$$

When two detectors are co-located, a simple logical AND condition can determine coincidences with high time resolution. When the two detectors are remote from each other, we can exchange a quantum state comb over a classical channel to find coincidences. A quantum state comb (hereinafter "comb") is an ordered list of measurement events. That is, a comb is a list of measured states in the order they arrive at a measurement node and/or a particular detector or group of detectors in the measurement node. A comb can also be an ordered list of measured events from different spatial positions. Also, a comb can be an ordered list of measured events from different polarizations or from different colors. Also, combs can be a combination of measured events that include any combination of the above and any other type measured events.

The comb time can be measured from various bases, such as a local clock, which can be synchronized in a relative and/or absolute basis to a non-local clock. The local clock can be a free running clock that is synchronized using shared entanglement via methods described herein. It should be understood that a comb includes more than one value per measured state. The value can be, for example, polarization, arrival time, frequency/color and/or spatial position. This is the case, for example, if an entangled state is a hyper-entangled state, where a single photon of a pair or set is entangled in more than one way (dimension or basis). In some embodiments, different members of a comb have different values. That is, a comb can include more than one type of entangled state where the more than one types of entangled states are not entangled with each other. This could be the case, for example, if quantum states from two different sources generating entangled states were multiplexed. This could be done, for example, to increase the rate of entangled pairs being generated.

The method requires exchanging information that includes singles and coincidences then sliding the combs past each other to find the maximum number of overlaps (e.g., cross correlation). Since many practical entanglement sources produce singles at a rate that is three or four orders of magnitude greater than the coincidence rate, a large amount of information must be exchanged and processed, most of which consists of background noise in the form of singles.

For example, if a given source has a singles rate of five thousand per second, and a coincidence rate of ten photons per second, then five-thousand-ten events must be exchanged over the channel per second of data collection. Subsequent processing involves sliding the two combs past each other. That process requires a number of comparison steps that is equal to the 1/(time resolution)×(2× the clock uncertainty between the two detectors). As an example, if the time resolution was 10 ns, and the clock uncertainty was 100 microseconds, the step count would be ⅒ ns×2×100 ms=20 million comparison steps. By contrast, if only coincidence information is exchanged, the step count would be eleven.

Figure 4:
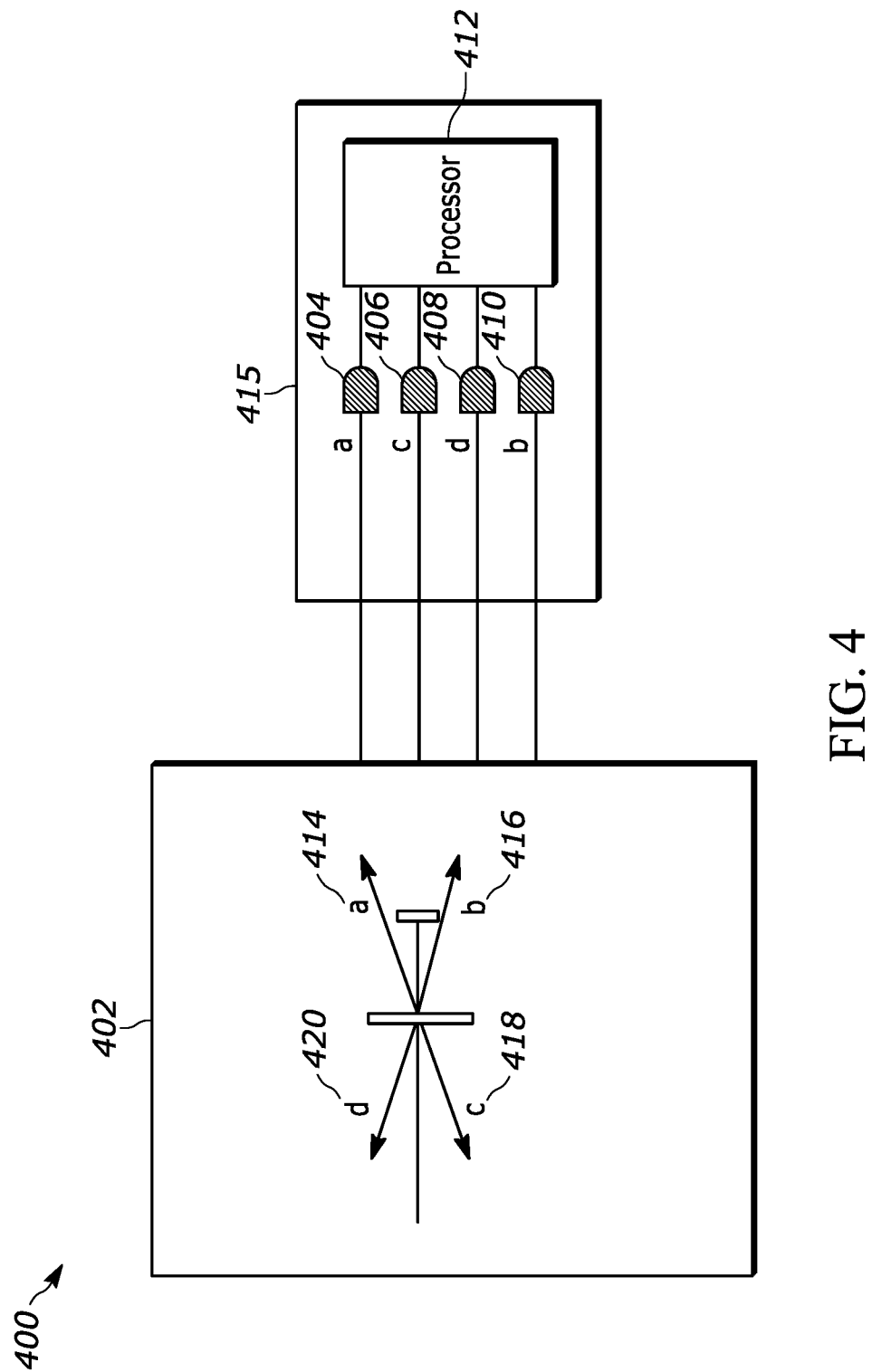
FIG. 4 illustrates an embodiment of a system for sharing quantum information within a single node using time-correlated quadruplet identification according to the present teaching.

FIG. 4 illustrates an embodiment of a system 400 for sharing quantum information within a single node 415 using time-correlated quadruplets of the present teaching. The source 402 generates four streams of photons that include at least some time-correlated photons at four outputs that are optically coupled to four detectors 404, 406, 408, 410. The four detectors 404, 406, 408, 410 each generate an electrical signal at an output in response to receiving a photon generated by the source 402. The outputs of each of the detectors 404, 406, 408, 410 are connected to a processor 412. In this embodiment, the detectors 404, 406, 408, 410 and the processor 412 are physically positioned in a node 415. The teaching is not limited to a particular type of node 415, but generally the node is configured to support localized, low-latency, information exchange and control over positions and time-of flight within the node 415. The source 402 can be, for example, the source 100 described in connection with FIG. 1, but can be any photon source that generates time-correlated photons. Each of the four detectors 404, 406, 408, 410 is connected to one of the four outputs from directions a 414, b 416, c 418 and d 420.

In this embodiment, the table 350 described in connection with FIG. 3B lists allowed conditions for event detections at the four detectors 404, 406, 408, 410. A feature of this system 400 configuration, which has all detectors co-located, is that it is easy to provide basic synchronization between the four detectors 404, 406, 408, 410. As such, the fine-grain, high resolution time correlation of the quadruplets can be easily exploited, because the local clocks are classically well synchronized. The processor 412 can include one or more logical AND gates or software to provide the logical functions. The AND gates produce a "high" signal when both input signals at the input are "high" and produces a "low" signal otherwise. Thus, coincident detections at any pair of detectors produce a "high" signal at both detectors' outputs. When these outputs are connected to two inputs of an AND gate, a "high" output is produced at that AND gate, which is synonymous with the detection.

For example, two detectors 404, 406 can be connected to an AND gate in processor 412 and the other two detectors 408, 410 are connected to a different AND gate. When the outputs of the two AND gates are both high because photons are present at all four detectors 404, 406, 408, 410, a time-correlated quadruplet is identified. This assumes equal time-of-flight from source to detectors and through AND gate outputs. It is understood that unequal times of flight can be addressed in various known ways.

We note that if the outputs of the two AND gates are provided to another AND gate, when that third AND gate is high, it correctly identifies the presence of a time-correlated quadruplet. This is true regardless of which pairs of detectors 404, 406, 408, 410 are connected to the AND gates. By putting outputs from detectors coupled to a front side (a or b) and a backside (d or c) into the same AND gate, it reduces the number of AND gate high counts, because the probability of singles appearing at the same time from the front and back directions is low. This can reduce the number of false identifications of time-correlated quadruplets based on a single AND gate connected to just two detectors being high. In some embodiments, this eliminates the need for a third AND gate to identify a time correlated quadruplet.

In this configuration, quantum metadata that is wavefunction data that indicates particular time windows where entangled photons are not generated can be used to discard any measured state values that are found in that window. This can be realized by having a metadata collector (not shown) that generates a "high" signal during time windows were single photons are generated, and a "low" signal otherwise. Taking this metadata signal and putting it into an AND gate into processor 412 with any or all of the inputs from detectors 404, 406, 408, 410 can prevent false positives.

One feature of the present teaching is that two photons in a set of entangled photons, which can be a quadruplet set, can be used to perform known entanglement functions. One useful application ghost imaging. Ghost imaging using pairs of photons is a known application that requires a plurality of entangled photons to be used as illumination and image photons. In connection with the system and method of the present teaching, if two photons in each of a plurality of sets of photons are used to formulate a ghost image, then the other photons can be used to identify the entangled set, or be used to improve performance of the ghost image system. For example, two photons of a set can be used for ghost imaging, one to provide the image but not in a path with the item being imaged, and the other used to illuminate the item. One or two other photons from the set are detected and the detected signals processed and used, e.g., for identifying the entangled set. In some embodiments, identification of the entangled set can be said to herald a particular ghost image measurement event as a pair without needing to access the photons of the pair.

Ghost imaging generally works with single photon arrivals measured in a single detector in positioned after a mask providing image information about the mask based on coincidences with paired single photon arrivals measured using a spatial sampling system positioned at a different location that is not in the path of the mask. There are different known configurations to implement ghost imaging, and the similar ghost masking systems. See, for example, Y. Shih, "The physics of ghost imaging," in International Conference on Quantum Information, paper QTuB1, Optica Publishing Group, 2008, and related publications by the same author. In embodiments including ghost imaging measurement of the present teaching, the arrival times of pairs participating in a ghost imaging path improve the measurement fidelity and speed. Specifically, this independent determination of arrival time, or identification of time-correlated pairs, can lead to improved image fidelity, imperviousness or tolerance to background, faster acquisition times, simplified operation and/or other beneficial features as compared to prior art ghost imaging that relies only on pairs.

Figure 5A:
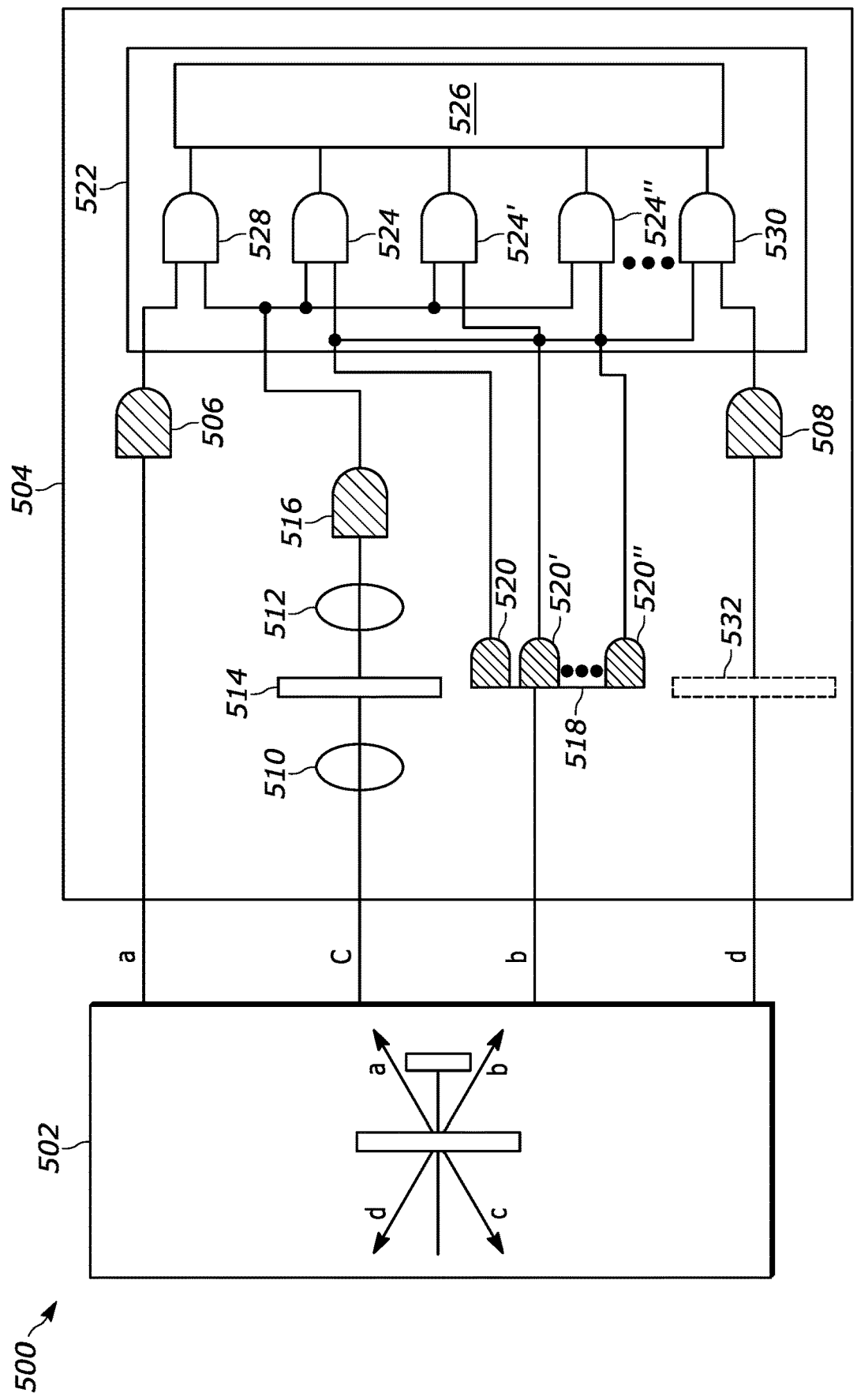
FIG. 5A illustrates an embodiment of an imaging system of the present teaching that includes ghost imaging measurement with entanglement identification in a single node.

FIG. 5A illustrates an embodiment of an imaging system 500 for of the present teaching that includes ghost imaging measurement with entanglement identification in a single node 504. In this embodiment of an imaging system 500 according to the present teaching, light from a source 502 that generates time-correlated quadruplets from the four directions a, b, c, and d at four outputs is coupled to a node 504. These different directions form independent paths for each of the time-correlated photons from the source 502.

The source 502 can be, for example, source 100 described in connection with FIG. 1. For discussion, it is assumed that time-of-flight issues are addressed such that photons generated at a same time are also detected such at nominally the same time, or that appropriate processing is provided to address time-of-flight differences between the different paths from source to detector.

Light coupled from direction a is coupled to a detector 506. Light coupled from direction d is coupled to a detector 508. Light coupled from direction c is coupled to a path that includes two imaging lenses 510 and 512 and an object 514.

Different embodiments can use imaging systems other than the two lens 510, 512 imaging system shown in FIG. 5A. Photons from one path illuminate an object. The object produces a modulation of the illumination and the imaging system forms a desired image of the object at an image plane based on that modulation. The modulation can include amplitude and/or phase modulation. The object 514 can be any object of which an image is desired to be determine. In some embodiments, the object 514 is a mask that blocks or passes light so as to form a two-dimensional pattern. In some embodiments, the object 514 is a three-dimensional object that blocks or passes light. A detector 516 is positioned behind the second lens 512. In some embodiments the detector 516 is positioned at the image plane of the imaging system. This detector 516 is sometimes referred to as a bucket detector at least in part because it accepts photons from the full image plane that corresponds to the object plane of object 514. However, it is understood that there is no spatial attribution to those detections because the detector does not resolve the spatial image.

Light from direction b is coupled to a path that includes a spatial sampling system 518. In some embodiments the spatial sampling system 518 is a two-dimensional array of single-photon-resolution detectors 520, 520', 520". In some embodiments (not shown), the spatial sampling system 518 includes an optical fiber coupled to a single photon detector that serves to spatially sample an x-y plane with translation. Thus, the photons from this path are detected with a spatial resolution that is capable of resolving detail in the image formed in the path from direction c. However, there is no imaging system in this path. The photon detections are received as a function of time, and their timing, and optionally their phase properties are recorded.

In embodiments having a two-dimensional array of single-photon-resolution detectors, each detector 520, 520', 520" has an output connected to a processor 522. The processor 522 can include AND gates 524, 524', 524", 528, 530 used to determine photon coincidences measured by detectors 506, 516, 508, 520, 520', ..., 520". As described herein, two-input AND gates produce a "high" signal at an output when pairs of detectors connected to two inputs detect photons simultaneously. Outputs from each detector 520, 520', 520" in the detector array 518 are input to one input of corresponding AND gates 524, 524', 524". Outputs from the detector 516 in that path with the object 514 are provided to the second input of each AND gate 524, 524', 524" connected to a detector in the array 518. Outputs of the AND gates 524, 524', 524" are provided to a processor 526. Ghost images are produced by the processor as the pattern of detector positions in the array 518 that have photons coincident with the detector 516, that results from the one-to-one spatial correlation of correlated photon pairs. This pattern, and related ghost image, can be determined by processor 526 based on the signals provided by the AND gates 524, 524', 524". As in traditional ghost imaging, if the AND gate processing between the bucket detector 516 and the array detectors 520, 520', ... 520" is not performed, the signal from the array 518 would look nominally "white", as background counts would be measured at individual detectors 520, 520', ... 520".

In addition to the traditional ghost imaging measurement, signals from detector 506 and/or detector 508 are used to help identify correlated pairs. The output of detector 506 is provided to one input of the AND gate 528. The other input of the AND gate 528 is connected to an output of detector 516. The output of detector 528 is provided to one input of AND gate 530. The other input of AND gate 530 is connected to all of the outputs of detectors 520, 520', 520". The outputs of the AND gates 528 and 530 are provided to the processor 526. The processor can process the outputs from the AND gates 524, 524', 524", 528, 530 in numerous ways. For example, the "high" signal from one or both of AND gates 528, 530 can be used as a trigger or marker to look for a coincidence-indicating "high" signal from one or more of AND gates 524, 524', 524". These embodiments that include processing of the signals from detector 506 and/or detector 508 provide, for example, robustness to background photons of the ghost imaging system.

In some embodiments, an optional second object 532 and associated imaging optics (not shown) can be placed in the path in front of a detector 508. In this case, a second ghost image of the second object 532 can be measured. In addition, composite images can be measured of both objects 514, 532. In general, various combinations of images can be realized, based on the pattern of coincidences that are determined by the processor 526 and based on the outputs of the AND gates 524, 524', 524", 528, 530. Similarly, an additional object and imaging optics can be placed in front of detector 506 to provide adaptable composites of three objects' images.

Many sources of quadruplet, triplet or dual entanglement also emit single uncorrelated photons at high rates that may be two or more orders of magnitude greater than entangled photons. Other sources of uncorrelated signals that manifest as single counts can be noise sources such as light in a room, or natural light from the sun and other background photon sources. It is advantageous in many applications to use low-cost sources of entanglement that emit large quantities of singles. It is also advantageous in many applications to operate outdoors in daylight or in strong artificial light.

The single uncorrelated photons from many of the common background sources occur at random intervals. If these random intervals overlap within the time resolution of detection hardware, AND gates or other coincidence detecting processors, they can be miscategorized as entangled photons. Since these uncorrelated photons are generated at statistically independent times, the probability of this miscategorization is the product of the probability of an uncorrelated photon arriving within a given time resolution raised to the power of the number of photons per set, which also corresponds in some embodiments to the number of detectors.

Thus, for pairs entanglement, the error is proportional to the probability of an uncorrelated photon arriving within the time resolution squared, for triplet's entanglement, the error is proportional to the probability of an uncorrelated photon arriving within the time resolution cubed, and for four-way or quadruplets entanglement, the error is proportional to the probability of an uncorrelated photon arriving within the time resolution to the fourth power. As such, interferometric measurement systems of the present teaching reduce the probability of errors in identification of a valid measurement point exponentially with the number of additional photons in the entangled set that are determined coincident with the measurement point photons. As such, in the imaging system 500, the AND, or coincidence detection 530 of detector 508 and the imaging detectors 520, 520', 520" reduces error. Furthermore, adding AND, or coincidence detection 528 of detector 506 reduces error even further.

As a numerical example, the probability of accidental coincidence in a microsecond window for a pair of detectors with random arrivals of 100,000 background photons per second at each detector is 1%. Three accidental coincidences probability is 0.1%, and four-way accidental probability is 0.01%.

One feature of the present teaching is that heralding of coincidences using the sets of entangled photons that number more than two allows two separate nodes to independently find coincidences so that the correlated imaging can be provided in remote locations.

Figure 5B:
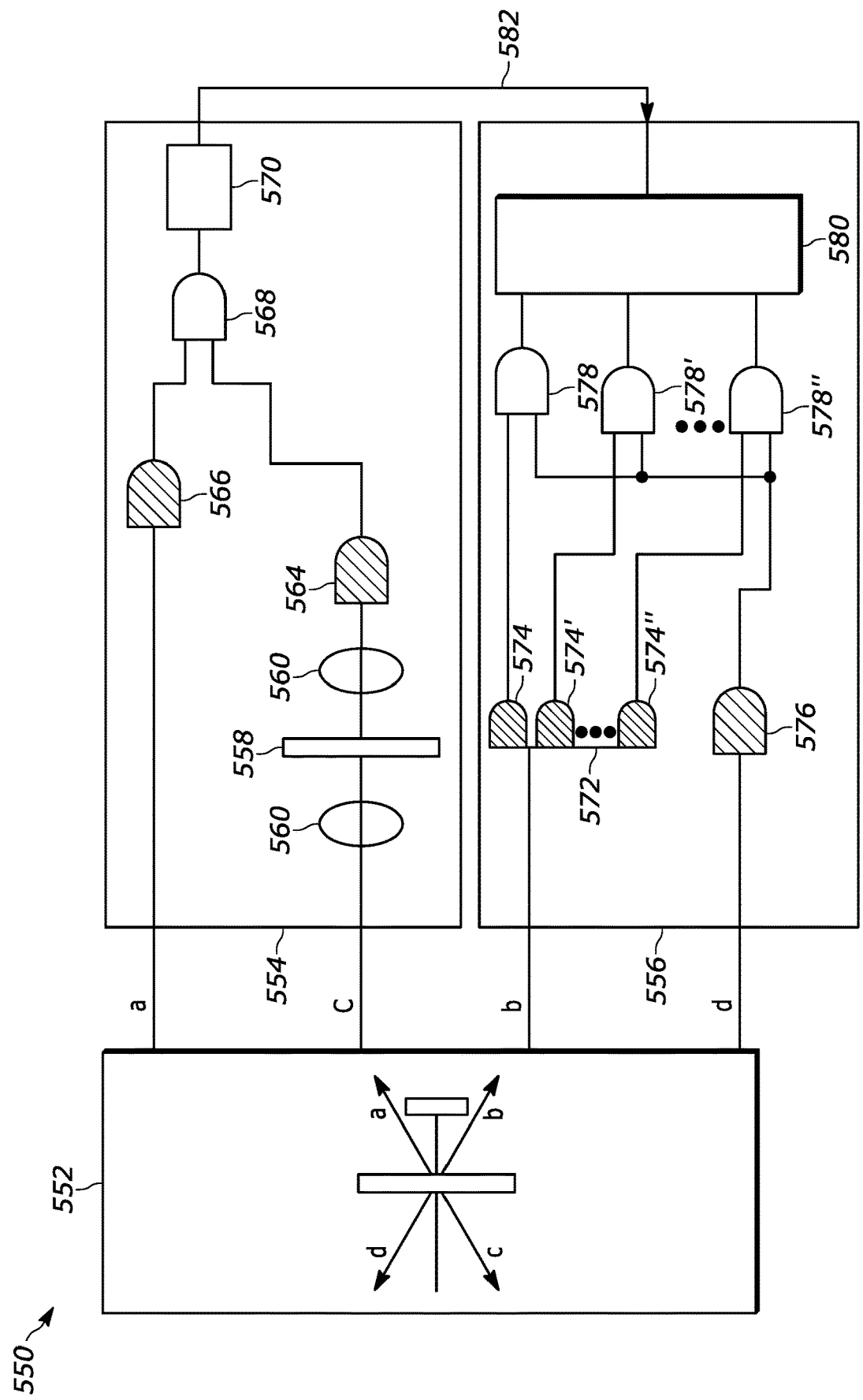
FIG. 5B illustrates an embodiment of an imaging system using entangled sets of photons of the present teaching that includes ghost imaging across two nodes connected with a classical channel.

FIG. 5B illustrates an embodiment of an imaging system 550 using entangled sets of photons of the present teaching that includes ghost imaging across two nodes 554, 556 connected with a classical channel. In this embodiment, light from a source 552 that generates time-correlated quadruplets from the four directions a, b, c, and d at four outputs is coupled to one node 554. The source 552 can be, for example, source 100 described in connection with FIG. 1. For discussion, it is assumed that time-of flight issues are addressed such that photons generated at a same time are also detected at nominally a same time. Compensating for time-of-flight issues can be addressed by known means.

Light from directions a and c are sent to one node 554 and light from directions b and d are sent to a second node 556. Light coupled from direction a is coupled to a detector 566. Light coupled from direction c is coupled to a path that includes imaging lenses 560, that can be two lenses on either side of an object 558. The object 558 can be any object of which an image is desired to be determine. In some embodiments the object 558 is a mask that blocks or passes light so as to form a two-dimensional pattern. In some embodiments, the object 558 is a three-dimensional object that blocks or passes light.

A detector 564 is positioned behind the imaging lenses 560 and object 558. This detector 564 can be referred to as a bucket detector at least in part because it accepts photons from the full image plane that corresponds to the object plane of object 558. An AND gate 568, or other coincidence determination system, is connected to the outputs of detectors 566, 564 and the output of the gate 568 input to a processor 570. In some embodiments, the processor 570 generates an ordered list of coincidences based on the output of the AND gate. The lists can be, for example, timestamps of coincidences, and/or coincidence events in time bins.

Light from direction d is coupled to a path that includes a spatial sampling system 572. In some embodiments the spatial sampling system 572 is a two-dimensional array of single-photon-resolution detectors 574, 574', ... 574". In some embodiments (not shown) the spatial sampling system 572 includes an optical fiber coupled to a single photon detector that serves to spatially sample an x-y plane by being moved. Light coupled from direction d is coupled to a detector 576. Each detector 574, 574', ... 574" has an output connected to a separate AND gate 578, 578', ... 578". Detector 576 is connected to another input to all of these AND gates 578, 578', ... 578". High signals from these AND gates 578, 578', ... 578", indicating a coincidence at the respective detector are collected by a processor 580 that, in some embodiments, generates one or more ordered list of coincidences. The lists can be, for example, timestamps of coincidences, and/or coincidence events in time bins. The ordered lists can be, for example, a single ordered list of coincidences, where each position of the spatial sampling system that corresponds to the coincidence is indicated in the list. The ordered lists can also be, for example, individual lists for each position of the spatial sampling system. The ordered lists can also be combinations of these.

The lists generated by processors 570, 580 can be shared over a classical channel that can be any of a variety of known communication channels. Lists can be shared in either direction to and from nodes 554, 556. One example is a list from processor 570 is sent to processor 580. By comparing a list of coincidences generated by processor 570 to the list or lists generated by processor 580, assuming at least some of the members of the lists contain measurements of photons that are generated in the same time window, and therefore can be entangled, it is possible to produce an image of the object 558 at the remote node 556.

One feature of this image generation is that it is not possible to generate that image from information sent on paths b and d and the classical channel 582. The list generated by processor 570 has no clear connection to the object. The image only manifests when locally detected coincidences in node 556 are compared with coincidences in node 554. For example, by comparing the list from 570 that is sent to node 556 with the list or lists generated by processor 580. That is, ghost images are produced as based on the pattern of detector positions in the array 572 that have photons coincident with the detector 564, that results from the one-to-one spatial correlation of correlated photon pairs. This pattern, and related ghost image, can be determined by processor 580 based on locally generated list(s) from AND gates 578, 578', . . . 578" and a list received from processor 570 generated based on signals from AND gate 568.

Figure 6:
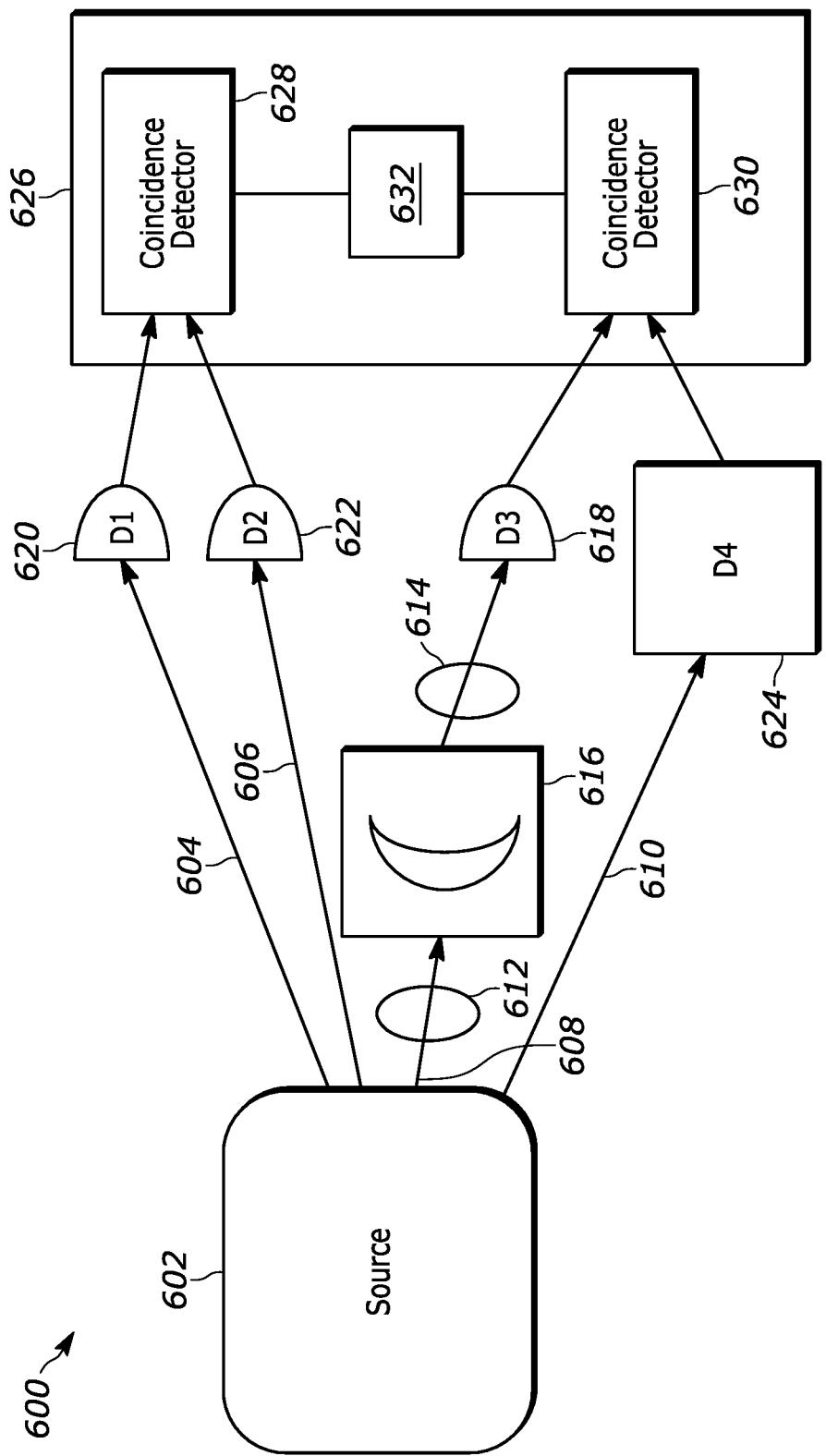
FIG. 6 illustrates an embodiment of an imaging system using entangled sets of photons of the present teaching that includes ghost imaging measurement of a single image with one pair of photons and a separate coincidence herald with a different pair.

FIG. 6 illustrates an embodiment of an imaging system 600 using entangled sets of photons of the present teaching that includes ghost imaging measurement of a single image with one pair of photons and a separate coincidence herald with a different pair. In this system 600, a source 602 generates sets of at least four entangled photons, each photon of a set emerging at different output ports along different paths 604, 606, 608, 610, or at least with distinct, separable individual modes. One pair of photons is detected at detectors D1 and D2 620, 622 whose outputs are connected to a coincidence detector 628. Another pair of photons from the same entangled set is sent to a ghost imaging set up. That is one of this pair of photons passes an imaging system of lenses 612, 614 and object 616 and is detected by a detector D3 618 whose output is connected to a coincidence detector 630. The other of this pair is detected at a spatially sensitive detector D4 624, that has an output connected to coincidence detector 630. The spatially sensitive detector D4 produces a signal at an output in response to detection of a photon that includes the X and/or Y position of the measured photon. The coincidence detector 630 is connected to a processor 632.

The processor 632 can produce an image of the object 616 in response to a plurality of measured coincidence events as in traditional ghost imaging. However, this image will be affected by false coincidences that may be the results of dark counts and/or background photons impinging on detector D3 and spatially sensitive detector D4. By also including comparison with coincidences determined by coincidence detector 628, false coincidences measured by coincidence detector 630 can be eliminated, thereby producing an improved image of the object 616. One feature of this configuration as compared to traditional two-entangled photon versions of ghost imagers is that less expensive, lower performance, and/or higher background detectors with less spatially sensitive detectors can be used.

Figure 7:
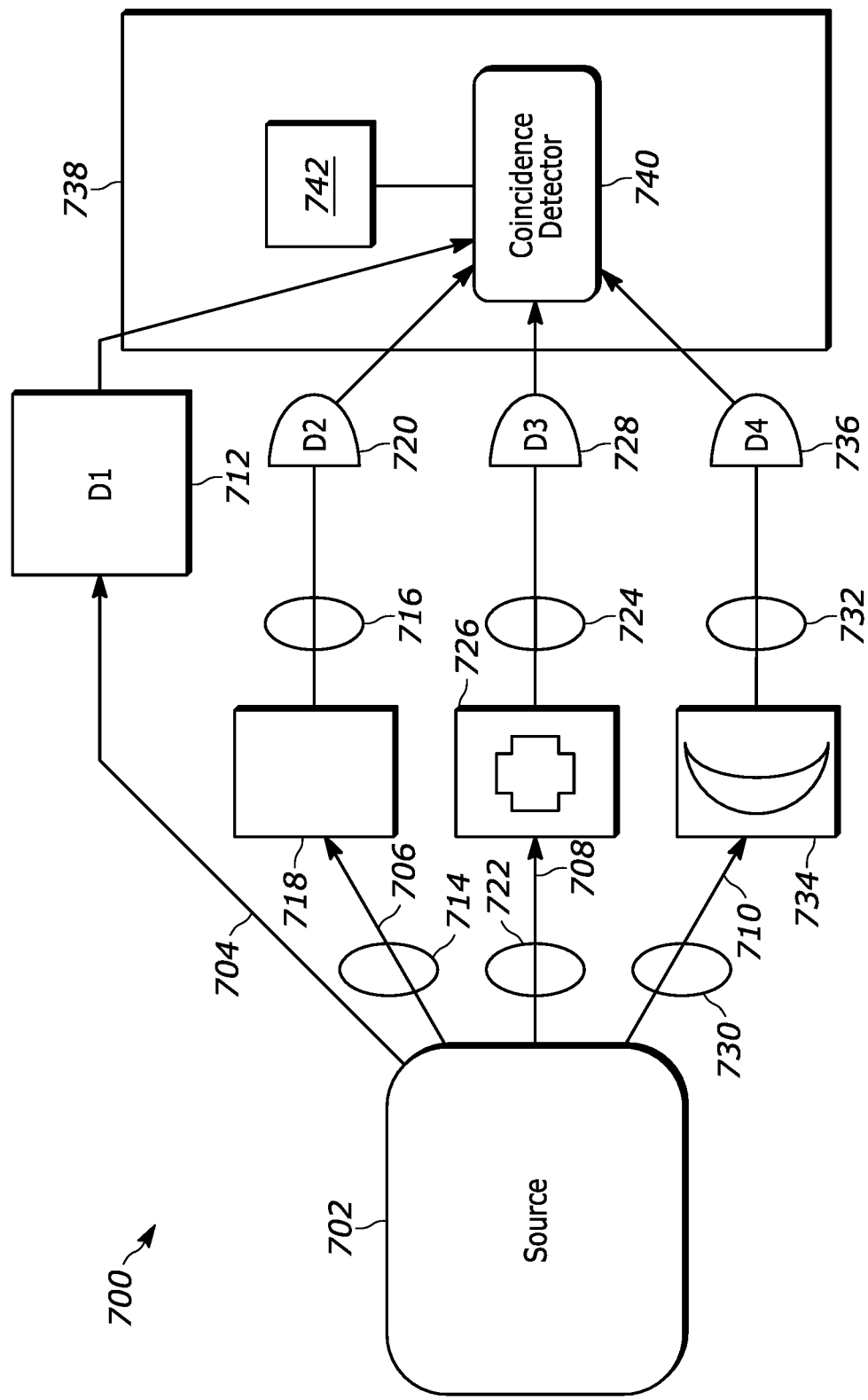
FIG. 7 illustrates an embodiment of an imaging system using entangled sets of photons of the present teaching that includes ghost imaging measurement of multiple images.

FIG. 7 illustrates an embodiment of an imaging system using entangled sets of photons of the present teaching that includes ghost imaging measurement of multiple images with one pair of photons and a separate coincidence herald with a different pair. In this system 700, a source 702 generates sets of at least four entangled photons, where each photon of a set emerges at different output ports along different paths 704, 706, 708, 710, or at least with distinct, separable individual modes. One of the set of photons is detected at spatially sensitive detector D1 712 whose output is connected to a coincidence detector 740. Another photon from the same entangled set is sent to an imaging system of lenses 714, 716 and to object 718 and then is detected by a detector D2 720 whose output is connected to coincidence detector 740.

Another photon from the same entangled set is sent to an imaging system of lenses 722, 724 and object 726 and is detected by a detector D3 728 whose output is connected to coincidence detector 740. Another photon from the same entangled set is sent to an imaging system of lenses 730, 732 and object 734 and is detected by a detector D4 736 whose output is connected to coincidence detector 740. The objects 718, 726, 734 can be the same or similar objects and/or they may be different objects. A processor 742 can compare coincidences between spatially sensitive detector D1 712 with various combinations of detectors D2 720, D3 728 and/or D4 736 to generate different images that are based on some combination of objects 718, 726, 734. For example, four-way simultaneous coincidences combined with the spatial sensitivity of D1 712 can produce a composite image of all three objects. Also, for example, three-way coincidences of spatially sensitive detections from D1 712 and any two of detectors D2 720, D3 728 and D4 736 can produce a composite of the two objects in the path of the respective two detectors. It should be understood that various combinations are possible. This kind of imaging system can produce similarity and difference data on the various objects as well as various combinations of objects. As a simple example, if objects 718 and 726 are masks that do not share any common transparency, then there will be no coincidences of D2 720 and D3 728, and therefore D1 712. As another example, a mask object 734 can be configured to find similarity between masks 718, 726 in different regions, because only when all three mask regions pass (or block) photons will coincidences (or lack of coincidences) be registered at D1 712. Various combinations of coincidences, combined with various combinations of masks are possible as understood by those skilled in the art. In addition, larger sets of entanglement can be used to expand to composites of more objects.

Said another way, in this system 700, multiple bucket detectors 720, 728, 736 are in the path of multiple objects 718, 726, 734 and illuminated by entangled photons from source 702. Generally, when detectors 720, 728, 736 all see a photon at the same time an image pixel is registered by a spatial sensitive detector 712. Other combinatorial logic behind the detectors 712, 720, 728, 736 can be used. For example, if AND conditions are met at D2 720 and D1 712, an image of a lightning bolt would be provided. If AND conditions are met at D3 728 and D1 712, an image of a cross would be provided. If AND conditions are met at D4 736 and D1 712, an image of a moon would be provided. All three pictures can be gathered by keeping all three of these pixel arrays in memory.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A system for imaging an object using entangled photons, the system comprising:
   a) an optical source configured to generate a set of four entangled photons that are correlated in time, such that detection of any one pair of the four entangled photons being correlated in time indicates that all four of the entangled photons are entangled, the output of the optical source being configured to couple a first photon of the set of four entangled photons to a first path, a second photon of the set of four entangled photons to a second path, a third photon of the set of four entangled photons to a third path and a fourth photon of the set of four entangled photons to a fourth path;
   b) a first detector positioned in the first path and configured to detect the first photon of the set of four entangled photons;
   c) an object plane positioned in the first path between the optical source and the first detector, wherein the object positioned at the object plane produces a modulation of the first photon of the set of four entangled photons;
   d) a spatial sampling system positioned in the second path and configured to detect the second photon of the set of four entangled photons;
   e) a second detector positioned in the third path and configured to detect the third photon of the set of four entangled photons;
   f) a third detector positioned in the fourth path and configured to detect the fourth photon of the set of four entangled photons;
   g) a first coincidence detector configured to determine a coincidence between a detection of the first photon of the set of four entangled photons and a detection of the third photon of the set of four entangled photons;
   h) a second coincidence detector configured to determine a coincidence between a detection of the second photon of the set of four entangled photons and a detection of the fourth photon of the set of four entangled photons; and
   i) a processor having an input connected to an output of the first coincidence detector and an input connected to an output of the second coincidence detector, the processor configured to generate an image of the object using the coincidences determined by the first and second coincidence detectors.

2. The system for imaging using entangled photons of claim 1 wherein the spatial sampling system comprises a spatial detector array.

3. The system for imaging using entangled photons of claim 1 wherein the spatial sampling system comprises an optical fiber.

4. The system for imaging using entangled photons of claim 1 wherein the optical source comprises a spontaneous down conversion source.

5. The system for imaging using entangled photons of claim 1 wherein the processor comprises a first processor having an input connected to the output of the first coincidence detector and a second processor having an input connected to the output of the second coincidence detector.

6. The system for imaging using entangled photons of claim 5 wherein the first processor is configured to generate a first ordered list of coincidences.

7. The system for imaging using entangled photons of claim 6 wherein the second processor is configured to generate a second ordered list of coincidences.

8. The system for imaging using entangled photons of claim 7 wherein the first and second processor are configured to share at least one of the first and second ordered list of coincidences over a classical communication channel.

9. A method for imaging using entangled photons, the method comprising:
   a) generating a set of four entangled photons that are correlated in time, such that any one pair of the four entangled photons being correlated in time indicates that all four of the entangled photons are entangled;
   b) directing a first photon of the set of four entangled photons along a first path;
   c) directing a second photon of the set of four entangled photons along a second path;
   d) directing a third photon of the set of four entangled photons along a third path;
   e) directing a fourth photon of the set of four entangled photons along a fourth path;
   f) illuminating an object positioned in an object plane in the first path with the first photon of the set of four entangled photons, thereby modulating the first photon of the set of four entangled photons;
   g) detecting the modulated first photon of the set of four entangled photons;
   h) spatially sampling the second photon of the set of four entangled photons in the second path;
   i) detecting the third photon of the set of four entangled photons in the third path;
   j) detecting the fourth photon of the set of four entangled photons in the fourth path;
   k) determining a coincidence between a detection of the modulated first photon of the set of four entangled photons and a detection of the third photon of the set of four entangled photons;
   l) Determining a coincidence between a spatial sample of the second photon of the set of four entangled photons and a detection of the fourth photon of the set of four entangled photons; and
   m) generating an image of the object positioned in the object plane using the determined coincidences.

10. The method for imaging using entangled photons of claim 9 wherein generating the image of the object using the determined coincidences comprises generating an ordered list of coincidences.

11. The method for imaging using entangled photons of claim 10 wherein the ordered list of coincidences comprises timestamps of coincidences.

12. The method for imaging using entangled photons of claim 10 wherein the ordered list of coincidences comprises coincidence events in time bins.

13. The method for imaging using entangled photons of claim 10 wherein the ordered list of coincidences comprises a single ordered list of coincidences where each position of the spatial sampling system that corresponds to a coincidence is indicated in the list.

14. The method for imaging using entangled photons of claim 10 wherein the ordered list of coincidences comprises individual lists for each position of a spatial sampling system.

15. The method for imaging using entangled photons of claim 10 further comprising sending the ordered list of coincidences over a classical channel.

16. The method for imaging using entangled photons of claim 9 wherein the spatial sampling is performed at a location that is remote from a location performing the illuminating the object.

17. The method for imaging using entangled photons of claim 9 further comprising reducing an error in the image using the determined coincidence between the detection of the modulated first photon of the set of four entangled photons and the detection of the third photon of the set of four entangled photons.

18. The method for imaging using entangled photons of claim 9 further comprising illuminating an object positioned in an object plane in the third path with the third photon of the set of four entangled photons, thereby modulating the third photon of the set of four entangled photons.

19. The method for imaging using entangled photons of claim 18 wherein the detecting the third photon of the set of four entangled photons in the third path comprises detecting the modulated third photon of the set of four entangled photons.

20. The method for imaging using entangled photons of claim 19 further comprising determining a similarity between the object positioned in an object plane in the first path and the object positioned in and object plane in the third path using the determined coincidence between the spatial sample of the second photon of the set of four entangled photons and the detection of the fourth photon of the set of four entangled photons.

21. A method of imaging, the method comprising:
a) generating a set of four entangled photons including a first, a second, a third, and a fourth entangled photons that are correlated in time, such that detection of any one pair of the four entangled photons indicates that all four of the entangled photons are entangled;
b) coupling the first entangled photon to a first path, the second entangled photon to a second path, the third entangled photon to a third path, and the fourth entangled photon to a fourth path;
c) generating a modulation of the first photon from an object positioned at an object plane;
d) detecting the modulated first entangled photon;
e) detecting the second entangled photon with a spatial sampler;
f) detecting the third entangled photon;
g) detecting the fourth entangled photon;
h) determining a coincidence between a detection of the modulated first entangled photon and a detection of the third entangled photon;
i) determining a coincidence between a spatial sample of the second entangled photon and the detection of the fourth entangled photon; and
j) generating an image of the object using the coincidences determined by the first and second coincidences.

* * * * *